US012753028B2

(12) United States Patent
Pidaparthi et al.

(10) Patent No.: US 12,753,028 B2
(45) Date of Patent: Oct. 6, 2026

(54) STATE ESTIMATION USING GEOMETRIC DATA AND VISION SYSTEM FOR PALLETIZING

(71) Applicant: Dexterity, Inc., Redwood City, CA (US)

(72) Inventors: Rohit Arka Pidaparthi, Mountain View, CA (US); William Arthur Clary, Pasadena, CA (US); Neeraja Abhyankar, Menlo Park, CA (US); Jonathan Kuck, Palo Alto, CA (US); Ben Varkey Benjamin Pottayil, Fremont, CA (US); Kevin Jose Chavez, Redwood City, CA (US); Shitij Kumar, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 19/009,661

(22) Filed: Jan. 3, 2025

(65) Prior Publication Data

US 2025/0214789 A1 Jul. 3, 2025

Related U.S. Application Data

(63) Continuation of application No. 17/837,775, filed on Jun. 10, 2022, now Pat. No. 12,214,975.

(Continued)

(51) Int. Cl.
*B65G 61/00* (2006.01)
*B25J 9/16* (2006.01)

(52) U.S. Cl.
CPC ............ *B65G 61/00* (2013.01); *B25J 9/1661* (2013.01); *B25J 9/1671* (2013.01); *B25J 9/1697* (2013.01)

(58) Field of Classification Search
CPC ............ B65G 61/00; B65G 2203/0233; B65G 2203/0258; B65G 2203/041;

(Continued)

(56) References Cited

U.S. PATENT DOCUMENTS 5,175,692 A 12/1992 Mazouz
5,908,283 A * 6/1999 Huang ................ G06Q 10/043 414/21

(Continued)

FOREIGN PATENT DOCUMENTS

| | | |
|---|---|---|
| JP | 6771799 | 10/2020 |
| JP | 2020196624 | 12/2020 |
| JP | 7362755 | 10/2023 |

OTHER PUBLICATIONS

Schuster et al: "Stable Stacking for the Distributor's Pallet Packing Problem", Intelligent Robots and Systems (IROS), 2010 IEEE/RSJ International Conference on, IEEE, Piscataway, NJ, USA, Oct. 18, 2010 (Oct. 18, 2010), pp. 3646-3651, XP031888390, DOI: 10.1109/IROS.2010.5650217 ISBN: 978-1-4244-6674-0.

*Primary Examiner* — B M M Hannan
(74) *Attorney, Agent, or Firm* — Van Pelt, Yi & James LLP

(57) ABSTRACT

A robotic system is disclosed. The system includes a communication interface that receives, from a sensor(s) deployed in a workspace, sensor data indicative of a current state of the workspace, the workspace comprising a pallet or other receptacle and a plurality of items stacked on or in the receptacle. The system includes one or more processors that control a robotic arm to place a first set of items on or in, or remove the first set of items from, the pallet or other receptacle, update a geometric model based on the first set of items placed on or in a receptacle, use the geometric model in combination with the sensor data to estimate a stack of one or more items on or in the receptacle, and use (Continued)

the estimated state to generate or update a plan to control the robotic arm to place a second set of items.

24 Claims, 10 Drawing Sheets

Related U.S. Application Data

(60) Provisional application No. 63/211,361, filed on Jun. 16, 2021.

(58) Field of Classification Search
CPC .. B65G 2203/042; B65G 57/03; B25J 9/1661; B25J 9/1671; B25J 9/1697; B25J 9/1687; G05B 2219/40006; G05B 2219/40607; G05B 2219/45063
USPC .......... 700/253
See application file for complete search history.

(56) References Cited

U.S. PATENT DOCUMENTS

| | | | | |
|---|---|---|---|---|
| 9,227,323 | B1 | 1/2016 | Konolige | |
| 9,600,798 | B2 | 3/2017 | Battles | |
| 9,682,481 | B2 * | 6/2017 | Lutz | B25J 5/007 |
| 9,802,317 | B1 * | 10/2017 | Watts | G05B 19/402 |
| 10,335,947 | B1 | 7/2019 | Diankov | |
| 10,456,915 | B1 | 10/2019 | Diankov | |
| 10,540,821 | B2 | 1/2020 | Musunuri | |
| 10,549,928 | B1 | 2/2020 | Chavez | |
| 10,576,630 | B1 | 3/2020 | Diankov | |
| 10,679,379 | B1 | 6/2020 | Diankov | |
| 11,020,854 | B2 | 6/2021 | Kanunikov | |
| 11,244,441 | B1 | 2/2022 | Jeanes | |
| 11,905,115 | B2 | 2/2024 | Sun | |
| 12,157,231 | B2 | 12/2024 | Kanunikov | |
| 12,162,704 | B2 | 12/2024 | Mccalib, Jr. | |
| 12,390,928 | B2 * | 8/2025 | Pidaparthi | B25J 9/1664 |
| 2010/0222915 | A1 * | 9/2010 | Kuehnemann | G06Q 10/08 706/14 |
| 2016/0355337 | A1 | 12/2016 | Lert | |
| 2017/0043953 | A1 | 2/2017 | Battles | |
| 2017/0246744 | A1 * | 8/2017 | Chitta | B25J 9/1687 |
| 2019/0194005 | A1 | 6/2019 | Shah | |
| 2020/0094997 | A1 | 3/2020 | Menon | |
| 2020/0101611 | A1 | 4/2020 | Ramanujam | |
| 2020/0130936 | A1 | 4/2020 | Shekhawat | |
| 2020/0130961 | A1 * | 4/2020 | Diankov | G06T 7/73 |
| 2020/0171653 | A1 | 6/2020 | Holson | |
| 2020/0270071 | A1 | 8/2020 | Chavez | |
| 2020/0398441 | A1 | 12/2020 | Marchese | |
| 2021/0004344 | A1 | 1/2021 | Cohen | |
| 2021/0053216 | A1 | 2/2021 | Diankov | |
| 2021/0096543 | A1 | 4/2021 | Stump | |
| 2021/0096553 | A1 | 4/2021 | Stump | |
| 2021/0129333 | A1 | 5/2021 | Kanunikov | |
| 2021/0139256 | A1 | 5/2021 | Fu | |
| 2021/0201221 | A1 | 7/2021 | Abraham | |
| 2021/0216767 | A1 | 7/2021 | Yu | |
| 2021/0312393 | A1 | 10/2021 | Stump | |
| 2022/0222623 | A1 | 7/2022 | Stump | |
| 2022/0297958 | A1 | 9/2022 | Moreno | |
| 2022/0402133 | A1 * | 12/2022 | Pidaparthi | B25J 9/1664 |
| 2022/0402134 | A1 | 12/2022 | Pidaparthi | |
| 2023/0044420 | A1 | 2/2023 | Abouelela | |
| 2023/0098524 | A1 | 3/2023 | Tiwari | |
| 2023/0124552 | A1 | 4/2023 | Sarkar | |
| 2024/0300104 | A1 | 9/2024 | Moreno | |
| 2024/0394643 | A1 | 11/2024 | Kristensen | |
| 2025/0010481 | A1 | 1/2025 | Neeraja | |
| 2025/0091270 | A1 | 3/2025 | Horie | |
| 2025/0214788 | A1 | 7/2025 | Felip Leon | |
| 2025/0381661 | A1 | 12/2025 | Sun | |
| 2026/0008619 | A1 | 1/2026 | Tiwary | |

* cited by examiner

400

500

MODEL USING GEOMETRIC DATA

MODEL USING SENSOR DATA

CURRENT STATE BASED ON BOTH GEOMETRIC DATA AND SENSOR DATA

775

800

STATE ESTIMATION USING GEOMETRIC DATA AND VISION SYSTEM FOR PALLETIZING

CROSS REFERENCE TO OTHER APPLICATIONS

This application is a continuation of U.S. patent application Ser. No. 17/837,775, entitled STATE ESTIMATION USING GEOMETRIC DATA AND VISION SYSTEM FOR PALLETIZING filed Jun. 10, 2022 which is incorporated herein by reference for all purposes, which claims priority to U.S. Provisional Application No. 63/211,361, entitled STATE ESTIMATION USING GEOMETRIC DATA AND VISION SYSTEM FOR PALLETIZING filed Jun. 16, 2021 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc.). When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an ordered list, etc., resulting in an unstable palletized or otherwise packed set.

Use of robotics is made more challenging in many environments due to the variety of items, variations in the order, number, and mix of items to be packed, on a given pallet for example, and a variety of types and locations of container and/or feed mechanisms from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
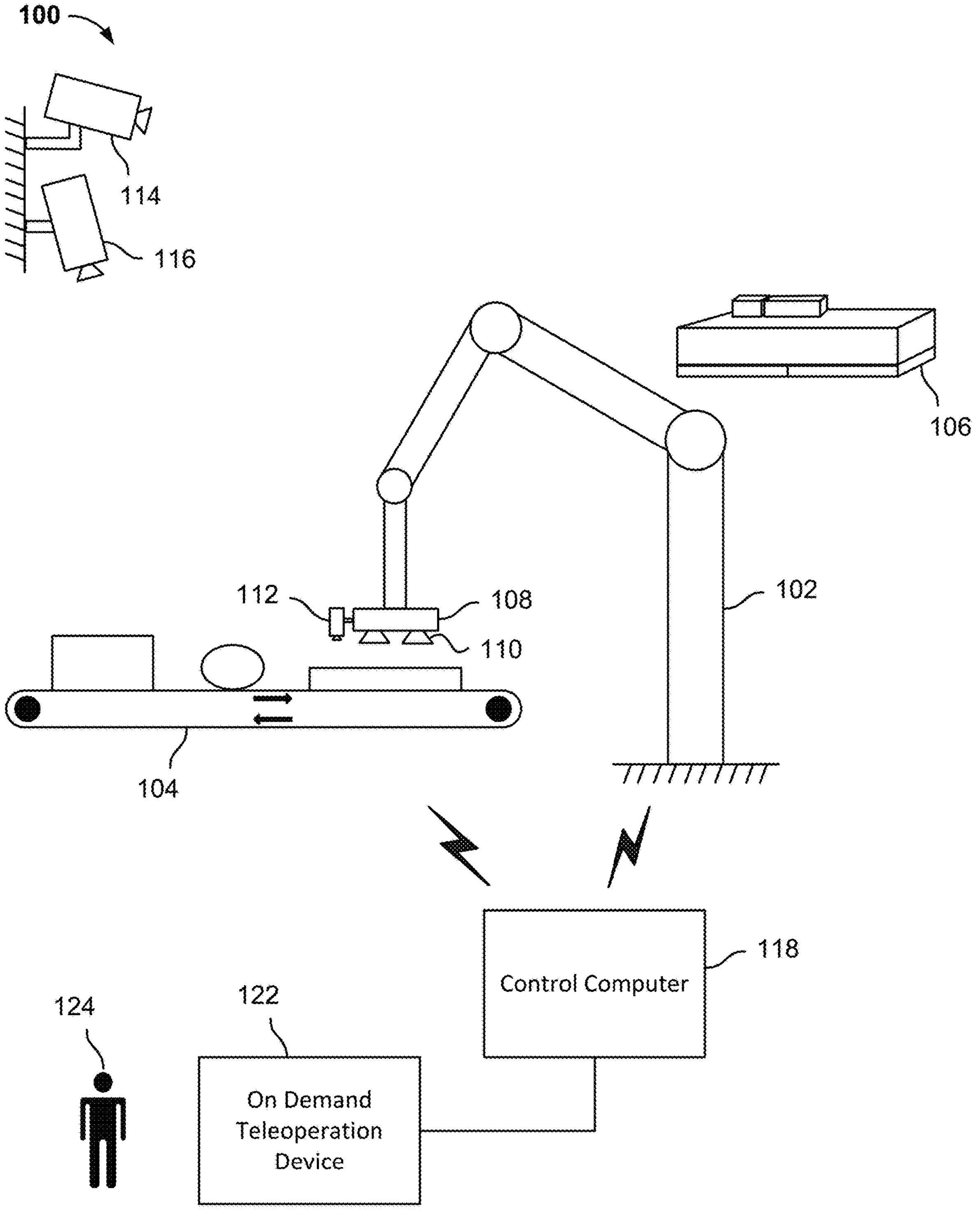
FIG. 1 is a diagram illustrating a robotic system to palletize and/or depalletize heterogeneous items according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a geometric model may mean a model of a state of a workspace such as a programmatically determined state. For example, the geometric model is generated using geometric data determined in connection with generating a plan to move an item in the workspace and an expected result if the item was moved according to plan. For example, a geometric model corresponds to a state of a workspace that is modified by controlling a robotic arm to pick, move, and/or place items within the workspace, and the picking, moving, and placing of the item is deemed to be performed according to plan (e.g., without error such as error or noise that may be introduced based on (i) a mis-configuration or mis-alignment of the robotic arm or another component in the workspace, (ii) a deforming of the item based on interaction with the robotic arm, (iii) another item in the workspace, another object in the workspace, (iv) a collision between the robotic arm, or item being moved by the robotic arm, and another object in the workspace, etc.).

As used herein, “pallet” includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various materials including wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure. An example palletization/depalletization system and/or process for palletizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of a singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and placing the one or more items in a predetermined location in a manner that a set of the one or more items corresponds to a kit. An example of a kitting system and/or process for kitting a set of items is further described in U.S. patent application Ser. No. 17/219,503, the entirety of which is hereby incorporated herein for all purposes.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of items on the pallet), any combination of the foregoing, and/or a sensor array comprising a plurality of sensors of the foregoing, etc.

Techniques are disclosed to programmatically use a robotic system comprising one or more robots (e.g., a robotic arm with suction, gripper, and/or other end effector at operative end) to palletize/depalletize and/or to otherwise pack and/or unpack arbitrary sets of non-homogeneous items (e.g., dissimilar size, shape, weight, weight distribution, rigidity, fragility, type, packaging, etc.).

Various embodiments include a system, method, and/or device for picking and placing items. The system includes a communication interface and one or more processors coupled to the communication interface. The communication interface is configured to receive, from one or more sensors deployed in a workspace, sensor data indicative of a current state of the workspace, the workspace comprising a pallet or other receptacle and a plurality of items stacked on or in the receptacle. The one or more processors are configured to: (i) control a robotic arm to place a first set of items on or in, or remove the first set of items from, the pallet or other receptacle, (ii) update a geometric model based on the first set of items placed on or in, or removed from, the pallet or other receptacle, (iii) use the geometric model in combination with the sensor data to estimate a state of the pallet or other receptacle and one or more items stacked on or in the receptacle, and (iv) use the estimated state to generate or update a plan to control the robotic arm to place a second set of items on or in, or remove the second set of items from, the pallet or other receptacle.

Related art systems may control a robot singly based on geometric data (e.g., controlling a robot by driving motors without using sensor data of a workspace as feedback), or sensor data (e.g., controlling a robot based on sensor data). However, related art systems do not use both geometric data and sensor data in connection with determining, or updating, a plan to move an item, and controlling a robotic arm to move the item according to the plan. Further, related art systems do not combine geometric data and sensor data to determine/update the plan and/or control the robotic arm to move the item. For related art robotic systems that rely on only geometric data in connection with controlling a robotic arm to move an item, the robotic system has very tight tolerances with respect to the manufacturing of the robot/robotic arm. Such tight tolerances generally increase the cost for the robot/robotic arm.

Robotic systems may be implemented to assemble a pallet with items and/or disassemble a pallet of items. The robotic system may use sensors and a robot (e.g., a robotic arm comprising an end effector to engage an item). The items assembled on a pallet may be a heterogeneous set of items. The robotic system generally determines a plan for placing the set of items and then controlling a robotic arm to place the set of items in accordance with the plan. For example, for each item, the robotic system generally determines a destination location on the pallet at which the item is to be placed. When determining where to place an item (e.g., the destination location), a robotic system generally obtains sensor data directed to the workspace, such as sensor data directed to the pallet, or the stack of items on the pallet. The robotic system determines the destination location based on the sensor data.

The reliance on sensor data to determine the location at which to place the item, or the plan for moving the item to the location, may cause errors or otherwise be inaccurate at least because of noise inherent in the sensor data and/or a mis-alignment or mis-calibration of the sensors used to obtain the sensor data. Accordingly, the assembly of a pallet with items and/or a disassembly of items from a pallet may be unpredictable.

Some challenges arising from the use of sensor data to determine a destination location at which to place an item, and/or to determine the assembly/disassembly of items on a pallet (e.g., the palletization/depalletization of items) include:

- Noise in sensor data. Examples of sources of noise in the sensor data include: (i) light reflecting off an item or object in the workspace, (ii) dust in the workspace, on an item on the pallet/stack, and/or on the item to be placed, (iii) poor quality reflective surfaces such as mirrors, (iv) reflective surfaces within the workspace such as a robot, a frame, a shelf, another item, an item on the pallet, etc., (v) heat or otherwise a temperature change in the environment, (vi) humidity in the environment, (vii) vibrations in the sensors, (viii) a sensor being knocked or moved during capture of the sensor data, etc.
- Sensor data being inaccurate based at least in part on a mis-calibrated sensor(s).
- Sensor data being inaccurate based at least in part on a sensor mis-alignment.
- Sensor data being inaccurate based at least in part on a sensor error.
- Sensor data being inaccurate or incomplete based at least in part on a field of view of a sensor. The field of view of the sensor may be incomplete or blocked by an item or object within the workspace of the robot.
- Control of robotic arm being inaccurate/imprecise based on a mechanical mis-alignment, or mis-calibration.

Various embodiments include a robotic system that uses sensor data and geometric data (e.g., a geometric model) in connection with determining a location to place one or more items on a pallet (or in connection with depalletizing one or more items from a pallet). A system may use different data sources to model the state of a pallet (or a stack of items on a pallet). For example, the system may estimate locations of one or more items on the pallet and one or more characteristics (or attributes) associated with the one or more items (e.g., a size of the item(s)). The one or more characteristics associated with the one or more items may include an item size (e.g., dimensions of the item), a center of gravity, a rigidity of the item, a type of packaging, a deformability, a shape, a location of an identifier, etc.

According to various embodiments, the system estimates a state (also referred to herein as an estimated state) of a workspace based at least in part on geometric data (e.g., a geometric model of the workspace) and sensor data (e.g., data obtained by one or more sensors deployed in a workspace). In response to obtaining the estimated state of the workspace, the system uses the estimated state in connection with moving an item in the workspace. For example, the system uses the estimated state to determine a plan and/or strategy for picking an item from a source location and placing the item at a target location (also referred to herein as a destination location).

According to various embodiments, the system determines the estimated state at least in part by performing an interpolation based on at least part of the geometric model and at least part of the sensor data. In some embodiments, an interpolation process performed with respect to a first part of the geometric model and a first part of the sensor data to obtain a first part of the estimated state is different from an interpolation performed with respect to a second part of the geometric model and a second part of the sensor data to obtain a second part of the estimated state.

In some embodiments, the system uses the estimated state in connection with determining a plan to palletize one or more items. For example, the system uses the estimated state in connection with selecting an item from a conveyor (or other item source) comprising a set of items (e.g., a sequence of items input to the workspace), controlling a robotic arm to pick the item, selecting a destination location corresponding to a position on a pallet or among a stack of items on a pallet, moving the item, and placing the item at the destination location.

In some embodiments, the system uses the estimated state in connection with determining a plan to depalletize one or more items. For example, the system uses the estimated state in connection with selecting an item from a pallet or from among a stack of items on a pallet, controlling a robotic arm to pick the item, selecting a destination location corresponding to a position on a receptacle or conveyor (e.g., that carries the item from the workspace), moving the item, and placing the item at the destination location.

In some embodiments, the system uses the estimated state in connection with determining a plan to singulate one or more items. For example, the system uses the estimated state in connection with selecting an item from a chute comprising a set of items, controlling a robotic arm to pick the item, selecting a destination location (e.g., a tray, a segment of a conveyor, etc.), moving the item, and placing the item at the destination location.

In some embodiments, the system uses the estimated state in connection with determining a plan to perform a kitting with respect to one or more items. For example, the system uses the estimated state in connection with selecting an item from a kitting shelf system comprising a plurality of shelves on which items are disposed, controlling a robotic arm to pick the item from a shelf, selecting a destination location (e.g., a receptacle such as a box, a tote, etc.), moving the item, and placing the item at the destination location.

According to various embodiments, the geometric model is determined based at least in part on one or more attributes for one or more items in the workspace. For example, the geometric model reflects respective attributes of a set of items (e.g., one or more of a first set that are palletized/stacked, and a second set of items that is to be palletized/stacked, etc.). Examples of an item include an item size (e.g., dimensions of the item), a center of gravity, a rigidity of the item, a type of packaging, a location of an identifier, a deformability of the item, a shape of the item, etc. Various other attributes of an item or object within the workspace may be implemented. As another example, the geometric model comprises an expected stability of one or more items stacked on or in the receptacle (e.g., a pallet). The geometric model may include an expected stability of a set of items (e.g., the stack of items) and/or an expected stability of individual items comprised in the stack of items. In some embodiments, the system determines an expected stability of an item based at least in part on (i) one or more attributes of the item; and (ii) one or more expected interactions with respect to the item and another item or object (e.g., a pallet) in the workspace. For example, the system may determine the expected stability based on a determination of an attribute of another item or object that contacts the item for which the expected stability is being computed (or that is placed in proximity to the item). Examples of attributes of other items that may impact the expected stability of a particular item include rigidity, deformability, a size, etc. As an example, if a particular item rests on another item that is rigid, the particular item is likely to have an improved expected stability as compared to a case whether the particular item rests on another item that is not rigid or less rigid. As another example, if a particular item rests on another item that is deformable, such as comprised of soft packaging, the particular item is likely to have a lesser expected stability as compared to a case where the particular item rests on another item that is not deformable or less deformable. As another example, if a particular item rests on another item having a top surface area that is greater than a bottom surface area of the particular item, or if a relatively high percentage of a bottom surface of the particular item is supported by a top surface of another item, then the expected stability of the item is relatively high or at least higher than if the particular item has a top surface area smaller than a bottom surface area of the particular item, or if a relatively high percentage of the bottom surface of the particular item is not supported/interacting with a top surface of another item.

In some embodiments, the system adjusts the sensor data to account for noise (e.g., sensor noise). The system can estimate the noise comprised in the sensor data based at least in part on an empirical analysis of the vision system. For example, an empirical analysis of the performance of the vision system can be performed to determine noise captured in (e.g., inherent in) the sensor data. In some embodiments, the system stores a predetermined sensor noise profile associated with the vision system. The system can use the sensor noise profile in connection with adjusting the sensor data to account for the noise. For example, the system can apply an adjustment to cancel out the expected noise based at least in part on the sensor profile. The empirical analysis of the performance of the vision system can include (i) manually/physically measuring an item or a workspace, (ii) capturing the same using the vision system, and (iii) determining a difference between the manual/physical measurement of the item/workspace and the measurements of the same using the sensor data (e.g., using digital processing, etc.). The system may deem the difference between the manual/physical measurement of the item/workspace and the measurements of the same using the sensor data as the noise profile. As an example, the system determines a variance in the sensor data and determines the sensor noise profile based at least in part on the variance. The empirical analysis can be performed with respect to a statistically significant set of experiments/measurements. Examples of noise (or inaccuracies in the sensor data) may include (i) imprecision of an image at edges of the field of view of the vision system, (ii) glare/reflection from items or other objects in the workspace, etc.

In some embodiments, the system adjusts the geometric model to account for noise (e.g., geometric noise or imprecision arising from translation of the geometric model to the physical world such as via controlling a robotic arm). The system can estimate the noise comprised in the geometric model based at least in part on an empirical analysis of the precision of the robotic control or other objects within the workspace (e.g., estimated deformation of a pallet, deviations in placement of the pallet versus a location used in the geometric model, etc.). For example, an empirical analysis of the performance of the control of the robotic arm (e.g., to perform a task such as placing an item) can be performed to determine noise captured in (e.g., inherent in) the geometric model. As an example, the system determines a variance in the geometric model and determines the geometric noise profile based at least in part on the variance. In some embodiments, the system stores a predetermined geometric noise profile associated with the vision system. The system can use the geometric noise profile in connection with adjusting the geometric model to account for the noise. For example, the system can apply an adjustment to cancel out the expected noise comprised in the geometric model (e.g., noise generated based on controlling a robot according to a plan determined based on the geometric model).

According to various embodiments, the system uses the geometric model and the sensor data to determine a best estimate of a state of the workspace. The system can adjust for (e.g., cancel) noise in one or more of the geometric model and/or sensor data. In some embodiments, the system detects anomalies or differences between a state according to the geometric model and a state according to the sensor data. In response to determining an anomaly or difference between the geometric model and the sensor data, the system can make a best estimate of the state notwithstanding the anomaly or difference. For example, the system can determine whether to use the geometric model or the sensor data, or a combination of (e.g., an interpolation between) the geometric model and the sensor data, etc. In some embodiments, the system determines the estimated state on a segment-by-segment basis (e.g., a voxel-by-voxel basis in the workspace, an item-by-item basis, or object-by-object basis, etc.). For example, a first part of the workspace may be estimated using only the geometric model, a second part of the workspace may be estimated using only the sensor data (e.g., in the event of an anomaly in the geometric model), and/or a third part of the workspace may be estimated based on a combination of the geometric model and the sensor data.

According to various embodiments, the system combines the geometric model and the sensor data to determine the estimated state of the workspace based at least in part on a predetermined bias. In some embodiments, the system uses the predetermined bias in connection with determining whether to deem the geometric model or the sensor data as ground truth that is modified with the other of the geometric model or the sensor data (e.g., to cure anomalies between the geometric model and the sensor data). As an example, if the predetermined bias indicates that the geometric model is to be biased, the system can use the geometric model and supplement the state according to the geometric model with sensor data. An example of a modification that the system may perform with respect to the state according to the geometric model is to use the sensor data to confirm placement of the items expected by the geometric model and if a difference between the sensor data and the geometric model exceeds a predetermined threshold, to either use the sensor data with respect to a part of the workspace in which the difference arises, or modify the geometric model with an interpolation of data using the geometric model and the sensor data (e.g., the part of the workspace in which the anomaly/difference is present can be subject to interpolation, or the entire workspace can be subject to interpolation, etc.).

In some embodiments, the bias with respect to the geometric model and the sensor data (or corresponding weighting applied to each type of information) is determined based at least in part on a determination of whether the geometric model or the sensor data is more accurate. Accuracy of the geometric model or the sensor data may be determined through empirical trials, or based on a variance of the information or noise comprised in the geometric model and/or sensor data. Robots are generally considered more accurate than sensors. Accordingly, in some embodiments, the bias is set to give preference or higher weighting to the geometric model as compared to the same for the sensor data. For example, a default bias may be set to more preferentially weight the geometric model rather than the sensor data.

An example of a context in which the geometric model and the sensor data may be incongruent (e.g., are different more than a predetermined difference threshold) includes the system using the geometric model to determine that a set of ten items are in corresponding locations stacked (e.g., the system programmatically stores ten item placements, etc.);

however, the sensor data my indicate that only eight items are stacked in the locations (e.g., locations at which the items are to be stacked by the geometric model). In response to determining that the sensor data shows that two boxes are missing, the system can determine whether the discrepancy between the geometric data and the sensor data arises because (i) a box has fallen from the stack (e.g., the sensor data may include a box on the floor or to the side of the stack), (ii) the field of view of the sensor is partially blocked by another object (e.g., the robotic arm), (iii) the boxes not included in the sensor data are deemed by the geometric model to be stacked behind other boxes and thus out of view of the sensor data, etc.

Another example of a context in which the geometric model and the sensor data may be incongruent (e.g., are different more than a predetermined difference threshold) includes the system's placement of a particular item among/on a stack of items; however, after placement of the particular item, the particular item falls from the stack of items. According to the geometric model in such a context, the system would deem the item to be on the stack of items in accordance with the plan determined based on the estimated state (e.g., the location at which the robotic arm placed the item in response to being controlled in accordance with the plan). However, the sensor data would not include the particular item placed at the expected destination location (e.g., among the stack of items). Instead, the sensor data would reflect the item having fallen from the stack of items (e.g., the item may be beside the stack of items, or otherwise out of the field of view of the sensor data). In response to determining that the sensor data shows that the item is missing, the system can determine whether the item has fallen from the stack (e.g., the sensor data may include a box on the floor or to the side of the stack).

An example of a context in which the geometric model and the sensor data may deviate from one another (e.g., are different more than a predetermined difference threshold) includes if the system places the item on another item whereby the other item is deformable. According to the geometric model, if the deformability of the other item exceeds an expected deformation (if any), then the placement of the particular item on the deformable other item may cause the actual placement of the particular item to possibly deviate from the geometric model (e.g., the placement of the item may be skewed by the extent to which the other item deformed based at least in part on the interaction with the particular item placed thereon, or by an extent to which the deformation of the other item exceeds an expected deformation).

The predetermined bias may be set based on user preference (e.g., a definition by an administrator) or a predefined state determination policy. The predetermined state determination policy may be set based on empirical data or simulations of picking and placing items. For example, the predetermined bias corresponds to a best bias (e.g., an optimal bias) for minimizing a cost function associated with moving items or palletizing items. In some embodiments, the cost function is based at least in part on one or more of an efficiency for moving the item(s), an expected time to move the item(s), a likelihood of success in moving/stacking the item(s), an expected stability associated with placement of an item (e.g., stability of the item after placing a particular item, stability of one or more other items or the stack after placing the particular item, etc.), etc. In some embodiments, the predetermined bias is selected from among a set of potential biases corresponding to placements of items for which a cost function is less than a predetermined cost threshold.

According to various embodiments, the system uses the predetermined bias in connection with determining respective weightings for the geometric model and the sensor data. For example, the system determines a first weighting corresponding to the geometric model and a second weighting corresponding to the sensor data, and the system uses a combination of the geometric model and the sensor data (e.g., combined in accordance with the first weighting and the second weighting, etc.) to determine the estimated state of the workspace.

In response to obtaining a current estimated state, the system uses the estimated state to determine a first plan for moving a first item within the workspace (e.g., stacking the item on a stack of items) and the system controls a robot to move the first item according to the first plan. In response to placing the first item, the system uses geometric data corresponding to the placement of the first item in connection with determining an initial updated estimated state. The system obtains sensor data (e.g., from a vision system), segments the sensor data to determine the object (e.g., to identify the object in the sensor model of the workspace), and determines an updated estimate state based at least in part on the initial updated estimated state (e.g., the geometric model) and the sensor data. For example, the system combines the geometric model and the sensor data in connection with determining the updated estimated state. In response to determining the updated estimated state, the system uses the updated estimated state to determine a second plan for moving a second item within the workspace and the system controls the robot to move the second item based at least in part on the second plan.

The use of the geometric model and the sensor data (e.g., a combination of the geometric model) enables various embodiments to be low-cost in comparison to related art systems. For example, the system can use the geometric model and the sensor data to detect anomalies (e.g., introduced by the geometric model or the sensor data) and to determine an estimated state of the workspace notwithstanding the anomalies (e.g., based on the selective use of the geometric model or the sensor data, or an interpolation between both). Accordingly, while related art systems require either high-precision (e.g., high tolerance) robotics or high-precision cameras, various embodiments can use relatively lower-precision (e.g., lower tolerance) robotics or a lower-precision (e.g., lower tolerance) vision system. The high tolerance requirements for robotics or cameras of related art systems result in the robotics and/or cameras used by such systems to be very expensive. According to various embodiments, the combination of both the geometric model and the sensor data can reduce cost and need for accuracy/precision in the robotics or vision system.

According to various embodiments, in response to the robot placing an item on the pallet, a system for estimating a state of the pallet and/or a stack of items on the pallet records information pertaining to the placement of the item (e.g., a location of the item, a size of the item, etc.). For example, the system has a logical knowledge of the state of the system based on where the robot has placed various items on the pallet. The logical knowledge may correspond to geometric data such as information obtained based on the manner by which the robot is controlled. However, the logical knowledge may differ from the real-world state of the pallet and/or a stack of items on the pallet. Similarly, as discussed above, the state of the pallet and/or a stack of items on the pallet as detected by the vision system (e.g., the real-world state modeled based on sensor data) may differ from the real-world state such as based on noise in the sensor data or inaccurate/incomplete sensor data. Various embodiments combine the views of the world using the geometric data (e.g., the logical knowledge) and the sensor data. The use of both the geometric data and the sensor data to model the world fills gaps in the world-view of each data set. For example, sensor data obtained based on the vision system may be used in connection with determining whether an expected state of the pallet or stack of items on the pallet needs to be updated/refined. The state estimation according to various embodiments provides better estimates of the state of the pallet and/or stack of items on the pallet than would be possible using sensors alone or geometric data alone. Further, the estimated state of the pallet and/or stack of items on the pallet may be used in connection with a palletizing/depalletizing items to/from a pallet. The use of better estimated states of the state of the pallet and/or stack of items on the pallet in connection with determining palletizing/depalletizing items to/from a pallet may provide better placements, which may lead to better final pallets (e.g., more tightly/densely packed pallets, more stable pallets, etc.).

In some embodiments, in response to a determination that the expected state of the pallet or stack of items using the geometric data is sufficiently different from the state of the pallet or stack of items using the vision system (e.g., the sensor data), the system may provide an indication to a user. For example, the system may prompt the user to confirm whether the expected state using the geometric data is correct, whether the state using the vision system is correct, or whether neither is correct and the user is to modify the current state. The user may use a user interface to reconcile the difference between the expected state using the geometric data and the state using the vision system. The determination that the expected state using the geometric data is sufficiently different from the state using the vision system may be based on a determination that a difference between the two states, or models of the state, exceeds a predefined threshold.

According to various embodiments, the system for estimating the state of the pallet and/or the stack of items on the pallet is implemented on a different computing system, such as a server(s). The modules or algorithms for modelling the state using the geometric data, modelling the state using the vision system (e.g., the sensor data), and updating the expected state (e.g., based on a reconciliation of the difference between the states) may be high cost and require relatively large amounts of computation power. Further, processing power at the robot workspace or computer system controlling the robot may have constraints on computational power and/or bandwidth to execute the modules. In some embodiments, the system controlling the robot may obtain the sensor data and information pertaining to the item to be placed, and send the sensor data and the information pertaining to the item to be placed to a server via one or more networks. In some embodiments, a plurality of servers may be used in connection with implementing the different modules for estimating the state of the system (e.g., the state of the pallet and/or the state of the stack of items on the pallet). For example, a module for modelling the state using the geometric data may be executed by a first server, a module for modelling the state using the vision system may be executed by a second server, and a module for updating the expected state based at least in part on the difference between the states may be executed by a third server. The various servers that may implement the different modules for determining the expected state may communicate with one another.

In some embodiments, a system that determines an estimated state (e.g., a pallet state estimator module/service, etc.) may store and/or manage a difference between (i) the state modeled based on the geometric data, and (ii) the state modeled based on the vision system. For example, the pallet state estimator may store/manage a current state of the pallet and/or stack of items on the pallet. The pallet state estimator may be a module executed by a computer system such as the robotic system controlling the robot that is palletizing/depalletizing items to/from the pallet, or by a server with which the robotic system controlling the robot is in communication.

According to various embodiments, the pallet state estimator may be used in connection with determining a current state during planning/placement of each item. For example, the robotic system controlling the robot and/or determining a plan for moving the item may query the pallet state estimator in connection with determining a plan to move the item. The pallet state estimator may be queried using (i) information pertaining to the item to be placed, and (ii) current sensor data obtained by the vision system. The current state using the geometric data may be stored by, or accessible by, the pallet state estimator. In some embodiments, information pertaining to the current geometric data may be communicated to the pallet state estimator in connection with the querying of the pallet state estimator for the current state. In some embodiments, because of the computational intensity of determining the current state using both the geometric data and the vision system (e.g., sensor data), the pallet state estimator may be queried for the current state after a placement of a predetermined number of items (e.g., N items, N being an integer). For example the pallet state estimator may be queried at a regular frequency. As another example, the pallet state estimator may be queried in response to a determination that an item that was placed (e.g., a previously placed item) had an irregular shape or a certain type of packaging (e.g., a packaging type with little rigidity, such as a poly bag).

In some embodiments, the pallet state estimator iteratively updates its internal model of the state (e.g., the world, the pallet, and/or the stack of items on the pallet, etc.) after placement of an item. The internal model of the state may correspond to a current state of the pallet and/or stack of items on the pallet. The pallet state estimator may update its internal model after placement of each item. For example, the robotic system controlling the robot may provide the information pertaining to the item (e.g., characteristic(s) of the items such as dimensions, weight, center of gravity, etc.), sensor data obtained by the vision system, and/or geometric data corresponding to the location at which the robot was controlled to place the item. In response to receiving the information pertaining to the item, sensor data, and/or geometric data, the pallet state estimator may update its internal model. For example, the pallet state estimator may (i) provide the sensor data to a module for modelling the state using sensor data, (ii) provide, to the module for modelling the state using geometric data, the geometric data and/or information pertaining to the item, and (iii) update its internal model based on a model of the state based on the sensor data and/or a model of the state based on the geometric data (e.g., or a difference between the two states).

The model of the state of the pallet and/or stack of items may be determined using the pallet as a reference (e.g., a bottom of the pallet may be used as a reference point as the bottom of the stack, etc.). The model may be updated after an item is placed such that the item is represented at the location at which the item is placed. The model of the state may be stored as a two dimensional grid (e.g., 10×10). The model may further comprise information associated with each item in the stack of items on the pallet. For example, one or more characteristics associated with the item may be stored in association with the item in the model. In some embodiments, a stability of the stack of items may be determined/computed based on the location of the various items on the stack, and the one or more characteristics associated with the items. The model of the state of the pallet may be translated to a representation in the physical world based on a predetermined translation between units of the stored model and the physical world.

Various embodiments comprise a robotic system that comprises a communication interface, and one or more processors coupled to the communication interface. The one or more processors may be configured to receive, via the communication interface, data associated with a plurality of items to be stacked on or in a destination location; generate based at least in part on the received data a plan to stack the items on or in the destination location; and implement the plan at least in part by controlling the robotic arm to pick up the items and stack the items on or in the destination location according to the plan. To generate the plan to stack the items on or in the destination location may comprise, for each item: determining the destination location based at least in part on a characteristic associated with the item, and at least one of (i) a characteristic of a platform or receptacle on which one or more items are to be stacked, and (ii) a current state of a stack of items on the platform or receptacle, wherein: the current state of a stack of items on the platform or receptacle is based at least in part on geometric data pertaining to placement of one or more items comprised in the stack of items, and sensor data pertaining to the stack of items obtained by a vision system. The current state of the stack of items may be determined based at least in part on a difference between the geometric data pertaining to placement of one or more items comprised in the stack of items and the sensor data pertaining to the stack of items obtained by a vision system. The current state of the stack of items on the platform or receptacle may be obtained based at least in part on the robotic system querying a pallet state estimator running on a server.

FIG. 1 is a diagram illustrating a robotic system to palletize and/or depalletize heterogeneous items according to various embodiments. In some embodiments, robotic system 100 is implemented at least in part in process 300 of FIG. 3, process 400 of FIG. 4, process 500 of FIG. 5, process 600 of FIG. 6, process 800 of FIG. 8, and/or process 900 of FIG. 9.

In the example shown, robotic system 100 includes a robotic arm 102. In this example the robotic arm 102 is stationary, but in various alternative embodiments, robotic arm 102 may be fully or partly mobile, e.g., mounted on a rail, fully mobile on a motorized chassis, etc. As shown, robotic arm 102 is used to pick arbitrary and/or dissimilar items (e.g., boxes, packages, etc.) from a conveyor (or other source) 104 and stack them on a pallet (e.g., platform or other receptacle) 106. The pallet (e.g., platform or other receptacle) 106 may comprise a pallet, a receptacle, or base with wheels at the four corners and at least partially closed on three of four sides, sometimes referred to as a three-sided "roll pallet," "roll cage," and/or "roll" or "cage" "trolley." In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In some embodiments, a plurality of receptacles 106 may be disposed around robotic arm 102 (e.g., within a threshold proximity or otherwise within range of the robotic arm). The robotic arm 102 may simultaneously (e.g., concurrently and/or contemporaneously) stack one or more items on the plurality of pallets. Each of the plurality of pallets may be associated with a manifest and/or order. For example, each of the pallets may be associated with a preset destination (e.g., customer, address, etc.). In some instances, a subset of the plurality of pallets may be associated with a same manifest and/or order. However, each of the plurality of pallets may be associated with different manifests and/or orders. Robotic arm 102 may place a plurality of items respectively corresponding to a same order on a plurality of pallets. Robotic system 100 may determine an arrangement (e.g., a stacking of items) on the plurality of pallets (e.g., how the plurality of items for an order are to be divided among the plurality of pallets, how the items on any one pallet are to be stacked, etc.). Robotic system 100 may store one or more items (e.g., item(s) for an order) in a buffer or staging area while one or more other items are stacked on a pallet. As an example, the one or more items may be stored in the buffer or staging area until such time that robotic system 100 determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack is expected to satisfy (e.g., exceeds) a threshold fit or threshold stability, and/or in connection with determining the threshold fit or threshold stability (e.g., the thresholds against which a simulation or model is measured to assess whether to place the item on the stack).

In the example shown, robotic arm 102 is equipped with a suction-type end effector (e.g., end effector 108). End effector 108 has a plurality of suction cups 110. Robotic arm 102 is used to position the suction cups 110 of end effector 108 over an item to be picked up, as shown, and a vacuum source provides suction to grasp the item, lift the item from conveyor 104, and place the item at a destination location on receptacle 106. Various types of end effectors may be implemented.

In various embodiments, robotic system 100 comprises a vision system that is used to generate a model of the workspace (e.g., a 3D model of the workspace and/or a geometric model). For example, one or more of 3D or other camera(s) 112 mounted on end effector 108 and cameras 114, 116 mounted in a space in which robotic system 100 is deployed are used to generate image data used to identify items on conveyor 104 and/or to determine a plan to grasp, pick/place, and stack the items on receptacle 106 (or place the item in the buffer or staging area, as applicable). In various embodiments, additional sensors not shown may be used to identify (e.g., determine) attributes of an item, grasp the item, pick up the item, move the item through a determined trajectory, and/or place the item in a destination location on or in receptacle 106 items on conveyor 104 and/or other sources and/or staging areas in which items may be located and/or relocated, e.g., by system 100. Examples of such additional sensors not shown may include weight or force sensors embodied in and/or adjacent to conveyor 104 and/or robotic arm 102, force sensors in the x-y plane and/or z-direction (vertical direction) of suction cups 110.

In the example shown, cameras 112 are mounted on the side of the body of end effector 108, but in some embodiments, cameras 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

In some embodiments, robotic system 100 comprises a dispenser device (not shown) that is configured to dispense a quantity of spacer material from a supply of spacer material in response to the control signal. The dispenser device may be disposed on robotic arm 102 or within proximity of the workspace (e.g., within a threshold distance of the workspace). For example, the dispenser device may be disclosed within the workspace of robotic arm 102 such that the dispenser device dispenses spacer material on or around receptacle 106 (e.g., pallet), or within a predetermined distance of end effector 108 of robotic arm 102. In some embodiments, the dispenser device comprises a mounting hardware configured to mount the dispenser device on or adjacent to an end effector 108 of robotic arm 102. The mounting hardware is at least one of a bracket, a strap, and one or more fasteners, etc. As an example, the dispenser device may comprise a biasing device/mechanism that biases supply material within the dispenser device to be ejected/dispensed from the dispenser device. The dispenser device may include a gating structure that is used to control the dispensing of spacer material (e.g., to prevent spacer material to be dispensed without actuation of the gating structure, and to permit dispensing of the spacer material to be dispensed in response to actuation).

The dispenser device may comprise a communication interface configured to receive a control signal. For example, the dispenser device may be in communication with one or more terminals such as control computer 118. The dispenser device may communicate with the one or more terminals via one or more wired connections and/or one or more wireless connections. In some embodiments, the dispenser device communicates information to the one or more terminals. For example, the dispenser device may send to control computer 118 an indication of a status of the dispenser device (e.g., an indication of whether the dispenser device is operating normally), an indication of a type of spacer material comprised in the dispenser device, an indication of a supply level of the spacer material in the dispenser device (e.g., an indication of whether the dispenser device is full, empty, half full, etc.), etc. Control computer 118 may be used in connection with controlling the dispenser device to dispense a quantity of spacer material. For example, control computer 118 may determine that a spacer is to be used in connection with palletizing one or more items, such as to improve an expected stability of the stack of items on/in receptacle 106. Control computer 118 may determine the quantity of spacer material (e.g., a number of spacers, an amount of spacer material, etc.) to use in connection with palletizing the one or more items. For example, the quantity of spacer material to use in connection with palletizing the one or more items may be determined based at least in part on determining a plan for palletizing the one or more items.

In some embodiments, the dispenser device comprises an actuator configured to dispense a quantity of spacer material from a supply of spacer material in response to the control signal. In response to determining that a spacer/spacer material is to be used in connection with palletizing one or more items, control computer 118 may generate the control signal to cause the actuator to dispense the quantity of spacer material. The control signal may comprise an indication of the quantity of spacer material to be used as the spacer.

According to various embodiments, a spacer or a spacer material is a rigid block. For example, a spacer or a spacer material may be a rigid block of foam. In some embodiments, a spacer or a spacer material comprises polyurethane.

In some embodiments, the supply of spacer material comprises a plurality of precut blocks. The plurality of precut blocks may be preloaded into a spring-loaded cartridge that biases the plurality of precut blocks to a dispensing end. In response to a precut block being dispensed from the cartridge, another of the plurality of precut blocks is pushed to a next-in-line position to be dispensed from the cartridge.

In some embodiments, the supply of spacer material comprises one or more of a larger block of spacer material, a strip of spacer material, and a roll of spacer material. The dispenser device or a robotic system 100 may comprises a cutter that is configured to cut the quantity of spacer material from the supply of the spacer material. In response to the control signal being provided to the actuator, the actuator may cause the cutter to cut the quantity of the spacer material from the supply of the spacer material.

In some embodiments, the supply of the spacer material comprises a liquid precursor. In response to the control signal being provided to the actuator, the actuator causes the quantity of the spacer material to be dispensed onto a surface of a pallet or a stack of items on the pallet. The dispensed precursor may harden after being dispensed onto the surface of the pallet or the stack of items on the pallet.

In some embodiments the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc. In some embodiments, the extruded material is filled with a gel.

In various embodiments, a robotically controlled dispenser, tooling, or machine fills the void between and/or adjacent to boxes to prepare the surface area for the next box/layer being placed. In some embodiments, robotic system 100 may use a robotic arm 102 to pick/place predefined cut material and/or may dynamically trim the spacer material to fit the need of the surface area of the next item being placed. In some embodiments, the robotically controlled dispenser device, or the robotic palletization system comprising the robotically controlled dispenser device comprises a device to trim the size of a rectangular solid from a long tube and/or packaging, and place the rectangular solid on an existing pallet in connection with preparing the surface area for a next box or item which the system determines may not normally fit on the pallet surface area (e.g., on an upper surface of a previous layer). The spacer may include, without limitation, foam, an inflated air plastic packet, wood, metal, plastic, etc. The dispenser device may place (e.g., eject, dispense, etc.) the rectangular solid (e.g., the spacer) on the pallet directly, and/or the device may dispense the rectangular solid (e.g., the spacer) in proximity of the robotic arm, and the end effector may reposition/place the rectangular solid (e.g., the spacer) on the pallet surface area. The dispenser device may dispense a predetermined amount (e.g., a correct amount or an expected amount) of the spacer material to correct or improve the surface area discrepancy between boxes or items on the layer (e.g., on the upper surface of the layer) to prepare the surface area for a next box or item.

Referring further to FIG. 1, in the example shown, robotic system 100 includes a control computer 118 configured to communicate, in this example, via wireless communication (but in one or both of wired and wireless communication in various embodiments) with elements such as robotic arm 102, conveyor 104, end effector 108, and sensors, such as cameras 112, 114, and 116 and/or weight, force, and/or other sensors not shown in FIG. 1. In various embodiments, control computer 118 is configured to use input from sensors, such as cameras 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model is used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

A user interface pertaining to operation of robotic system 100 may be provided by control computer 118 and/or teleoperation device 122. The user interface may provide a current status of robotic system 100, including information pertaining to a current state of the pallet (or stack of items associated therewith), a current order or manifest being palletized or de-palletized, a performance of robotic system 100 (e.g., a number of items palletized/de-palletized by time), etc. A user may select one or more elements on the user interface, or otherwise provide an input to the user interface, to activate or pause robotic system 100 and/or a particular robotic arm in robotic system 100.

According to various embodiments, robotic system 100 implements a machine learning process to model a state of a pallet such as to generate a model of a stack on the pallet. The machine learning process may include an adaptive and/or dynamic process for modeling the state of the pallet. The machine learning process may define and/or update/refine a process by which robotic system 100 generates a model of the state of the pallet. The model may be generated based at least in part on input from (e.g., information obtained from) one or more sensors in robotic system 100 such as one or more sensors or sensor arrays within the workspace of robotic arm 102. The model may be generated based at least in part on a geometry of the stack, a vision response (e.g., information obtained by one or more sensors in the workspace), and the machine learning processes, etc. Robotic system 100 may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator).

In the context of palletizing one or more items, robotic system 100 may generate the model of the state of the pallet in connection with determining whether to place an item on the pallet (e.g., on the stack), and selecting a plan for placing the item on the pallet, including a destination location at which the item is to be placed and a trajectory along which the item is to be moved from a source location (e.g., a current destination such as a conveyor) to the destination location. Robotic system 100 may also use the model in connection with determining a strategy for releasing the item, or otherwise placing the item on the pallet (e.g., applying a force to the item to fit the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. Robotic system 100 may select a destination location for which the expected fit and/or expected stability satisfies (e.g., exceeds) a corresponding threshold value. Additionally, or alternatively, robotic system 100 may select a destination location that optimizes the expected fit (e.g., of the item on the stack) and/or expected stability (e.g., of the stack).

Conversely, in the context of de-palletizing one or more items from a pallet (e.g., a stack on the pallet), robotic system 100 (e.g., control computer 118) may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, control computer 118 may use the model to determine whether removal of an item is expected to cause stability of the state of the pallet (e.g., the stack) to drop below a threshold stability. Robotic system 100 (e.g., control computer 118) may simulate removal of one or more items from the pallet and select an order for removing items from the pallet that optimizes the stability of the state of the pallet (e.g., the stack). Robotic system 100 may use the model to determine a next item to remove from the pallet. For example, control computer 118 may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, robotic system 100 may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a machine learning process is implemented in connection with improving grasping strategies (e.g., strategies for grasping an item). Robotic system 100 may obtain attribute information pertaining to one or more items to be palletized/de-palletized. The attribute information may comprise one or more of an orientation of the item, a material (e.g., a packaging type), a size, a weight (or expected weight), or a center of gravity, etc. Robotic system 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, robotic system 100 may use the information pertaining to the item (e.g., the attribute information, destination location, etc.) to determine a strategy for picking the item. The picking strategy may include an indication of a picking location (e.g., a location on the item at which the robotic arm 102 is to engage the item such as via the end effector). The picking strategy may include a force to be applied to pick the item and/or a holding force by which the robotic arm 102 is to grasp the item while moving the item from a source location to the destination location. Robotic system 100 may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes).

According to various embodiments, robotic system 100 may determine to use a spacer or a quantity of the spacer material in connection with palletizing one or more items in response to a determination that the use of the spacer or quantity of the spacer material will improve the result of a stack of items on the pallet (e.g., improve the stability of the stack of items). In some embodiments, the determination that the placing of the one or more spacers in connection with placing the set of N items on the pallet will result in an improved stack of items on the pallet is based at least in part on one or more of a packing density, a level top surface, and a stability. In some embodiments, the determination that the placing of the one or more spacers in connection with placing the set of N items on the pallet will result in an improved stack of items on the pallet is based at least in part on a determination that a packing density of the stack of items with the set of N items is higher than a packing density if the set of N items are placed on the pallet without the one or more spacers. In some embodiments, the determination that the placing of the one or more spacers in connection with placing the set of N items on the pallet will result in an improved stack of items on the pallet is based at least in part on a determination that a top surface is more level than a top surface if the set of N items are placed on the pallet without the one or more spacers. In some embodiments, the determination that the placing of the one or more spacers in connection with placing the set of N items on the pallet will result in an improved stack of items on the pallet is based at least in part on a determination that a stability of the stack of items with the set of N items is higher than a stability if the set of N items is placed on the pallet without the one or more spacers. N may be a positive integer (e.g., a positive integer less than a total number of items that are to be palletized in the complete pallet).

As an example, because N may be less than a total number of items that are to be palletized, robotic system 100 may be limited in its optimization of the stack of items (e.g., robotic system 100 may only plan the placement of N items at a time). Accordingly, the use of one or more spacers increases the number of degrees of freedom associated with placing the N items. Robotic system 100 may use one or more spacers to optimize the stacking of the N items (or to achieve a "good enough" stack with the N items such as a stack that satisfies a minimum stability threshold). Robotic system 100 may use a cost function in connection with determining whether to use one or more spacers, a number of spacers to use, a placement of the spacers, etc. For example, the cost function may include one or more of a stability value, a time to place the one or more items, a packing density of the stack of items, a flatness value or degree of variability of the top of the upper surface of the stack of items, and a cost of supply material, etc.

According to various embodiments, control computer 118 controls robotic system 100 to place a spacer on a receptacle 106 (e.g., a pallet) or a stack of items in connection with improving a stability of the stack of items on the receptacle 106. As an example, the spacer may be placed in response to a determination that a stability of the stack of items is estimated (e.g., likely such as a probability that exceeds a predefined likelihood threshold value) to be improved if the spacer is used. As another example, control computer 118 may control robotic system 100 to use the spacer in response to a determination that a stability of the stack of items is less than a threshold stability value, and/or that the stability of the stack of items is estimated to be less than a threshold stability value in connection with the placement of a set of items (e.g., a set of N items, N being an integer).

According to various embodiments, control computer 118 may determine the stability of a stack of items based at least in part on a model of a stack of items and/or a simulation of placing a set of one or more items. A computer system may obtain (e.g., determine) a current model of a stack of items, and model (e.g., simulate) the placing of a set of item(s). In connection with modeling the stack of items, an expected stability of the stack of items may be determined. The modelling of the stack of items may include modelling the placement of a spacer in connection with the modelling of the placement of the set of item(s).

In some embodiments, control computer 118 may determine the stability of the stack of items (or simulated stack of items) based at least in part on one or more attributes of a top surface of the stack of items (or simulated stack of items) and/or spacers. For example, a measure of an extent to which the top surface is flat may be used in connection with determining the stability of the stack of items. The placing of a box on a flat surface may result in a stable placement and/or stack of items. As another example, a surface area of a flat region on the top surface may be used in connection with determining the stability or expected stability of the placement of an item on the stack of items. The larger a flat region on a top surface of the stack of items is relative to a bottom surface of an item being placed on the stack of items, the greater the likelihood that the stability of the stack of items will satisfy (e.g., exceed) a threshold stability value.

According to various embodiments, robotic system 100 generates a model of a pallet or a stack of one or more items on the pallet, and the spacer or spacer material is determined to be placed in connection with the palletization of one or more items based at least in part on the model of the pallet or the stack of one or more items on the pallet. Robotic system 100 may generate a model of at least a top surface of a pallet or a stack of one or more items on the pallet, determine a set of N items to be placed next on the pallet (e.g., N being a positive integer), determine that placing one or more spacers in connection with placing the set of N items on the pallet will result in an improved stack of items on the pallet compared to a resulting stack of placing the set of N items without spacers, generate one or more control signals to cause the actuator to dispense the quantity of spacer material corresponding to the one or more spacers, and provide the one or more control signals to the actuator in connection with placing the set of N items on the pallet.

According to various embodiments, variation in items (e.g., types of items) among items to be palletized may complicate the palletization of the items in a stable manner (e.g., a manner according to which the stability of the stack of items satisfies a threshold stability value). In some embodiments, control computer 118 may only be able to forecast a certain number of items that are to be palletized. For example, the system may have a queue/buffer of N items to be palletized, where N is a positive integer. N may be a subset of a total number of items to be stacked on a pallet. For example, N may be relatively small in relation to the total number of items to be stacked on the pallet. Accordingly, robotic system 100 may only be able to optimize the stacking of items using the next N known items. For example, robotic system 100 may determine a plan to stack one or more items according to the current state of the stack of items (e.g., a current model) and one or more attributes associated with the next N items to be stacked. In some embodiments, the use of one or more spacers may provide flexibility in the manner in which the next N items are to be stacked and/or may improve the stability of the stack of items.

Various embodiments include palletization of a relatively large number of mixed boxes or items on a pallet. The various boxes and items to be palletized may have different attributes such as heights, shapes, sizes, rigidity, packaging type, etc. The variations across one or more attributes of the various boxes or items may cause the placement of the items on a pallet in a stable manner to be difficult. In some embodiments, robotic system 100 (e.g., control computer 118) may determine a destination location (e.g., a location at which an item is to be placed) for an item having a greater surface area (e.g., a larger bottom surface) than the boxes or other items beneath the item being placed. In some embodiments, items having different heights (e.g., different box heights) may be placed on relatively higher areas of the pallet (e.g., a height greater than a height threshold value equal to a maximum pallet height multiplied by 0.5, a height greater than a height threshold value equal to a maximum pallet height multiplied by ⅔, a height greater than a height threshold value equal to a maximum pallet height multiplied by 0.75, a height greater than a height threshold value equal to a maximum pallet height multiplied by another predefined value).

According to various embodiments, a machine learning process is implemented in connection with improving spacer material dispensing/usage strategies (e.g., strategies for using spacer material in connection with palletizing one or more items). Robotic system 100 may obtain attribute information pertaining to one or more items to be palletized/de-palletized, and attribute information pertaining to one or more spacers to be used in connection with palletizing/de-palletizing the one or more items. The attribute information may comprise one or more of an orientation of the item, a material (e.g., a spacer material type), a size, a weight (or expected weight), a center of gravity, a rigidity, a dimension, etc. Robotic system 100 may also obtain a source location (e.g., information pertaining to the input conveyor from which the item is to be picked) and may obtain information pertaining to a pallet on which the item is to be placed (or set of pallets from which the destination pallet is to be determined such as a set of pallets corresponding to the order for which the item is being stacked). In connection with determining a plan for picking and placing the item, robotic system 100 may use the information pertaining to the item (e.g., the attribute information, destination location, etc.) to determine a strategy for palletizing the item (e.g., picking and/or placing the item). The palletizing strategy may include an indication of a picking location (e.g., a location on the item at which the robotic arm 102 is to engage the item such as via the end effector) and a destination location (e.g., a location on the pallet/receptacle 106 or stack of items). The palletizing strategy may include a force to be applied to pick the item and/or a holding force by which the robotic arm 102 is to grasp the item while moving the item from a source location to the destination location, a trajectory along which the robotic arm is to move the item to the destination location, an indication of a quantity, if any, of spacer material that is to be used in connection with placing the item at the destination location, and a plan for placing the spacer material. Robotic system 100 may use machine learning processes to improve the palletizing strategies based at least in part on an association between information pertaining to the item (e.g., the attribute information, destination location, etc.) and one or more of (i) performance of picking and/or placing the item (e.g., historical information associated with past iterations of picking and placing the item or similar items such as items sharing one or more similar attributes), (ii) performance of a stability of the stack of items after the item is placed at the destination location such as relative to an expected stability generated using a model of the stack of items (e.g., historical information associated with past iterations of palletizing the item or similar items such as items sharing one or more similar attributes), and (iii) performance of a stability of the stack of items after the item and/or spacer material is placed at the destination location such as relative to an expected stability generated using a model of the stack of items (e.g., historical information associated with past iterations of palletizing the item or similar items and/or spacers such as items/spacers sharing one or more similar attributes). In some embodiments, robotic system 100 may use machine learning processes to improve the use of one or more spacers in connection with palletizing strategies based at least in part on an association between information pertaining to the spacers and/or one or more items that are palletized (e.g., the attribute information, destination location, etc.) and a stability performance of palletizing a set of items using one or more spacers relative to an expected stability of the palletizing of the set of items using the one or more spacers (e.g., the expected stability based on a simulation of the palletizing of the items using a model of the stack of items).

The model generated by robotic system 100 can correspond to, or be based at least in part on, a geometric model. In some embodiments, robotic system 100 generates the geometric model based at least in part on one or more items that have been placed (e.g., items for which robotic system 100 controlled robotic arm 102 to place), one or more attributes respectively associated with at least a subset of the one or more items, one or more objects within the workspace (e.g., predetermined objects such as a pallet, a robotic arm(s), a shelf system, a chute, or other infrastructure comprised in the workspace). The geometric model can be determined based at least in part on running a physics engine on control computer 118 to model a stacking of items (e.g., models a state/stability of a stack of items, etc.). The geometric model can be determined based on an expected interaction of various components of the workspace, such as an item with another item, an object, or a simulated force applied to the stack (e.g., to model the use of a forklift or other device to raise/move a pallet or other receptacle on which a stack of items is located).

In some embodiments, the system updates the geometric model after movement (e.g., placement) of each item. For example, the system maintains (e.g., stores the geometric model) the geometric model corresponding to a state of the workspace such as a state/stability of a stack of items and location of one or more items among the stack of items. The geometric model uses a current geometric model in connection with determining a plan to move an item, and controlling a robotic arm to move an item. In response to movement of the item, the system updates the geometric model to reflect the movement of the item. For example, in the case of de-palletizing a stack of items, in response to a particular item being picked and moved from the stack of items, the system updates the geometric model such that the particular item is no longer represented as being on the stack and is comprised in the geometric model at a destination location at which the particular item was placed, or in the event that the destination location is outside the workspace, the geometric model is updated to remove the item. Further, the geometric model is updated to reflect a stability of the stack of items after the particular item has been removed from the stack. As another example, in the case of palletizing a set of items, the system updates the geometric model to reflect placement of a particular item on/among a stack of items. The system can update the geometric model to include an updated stability of the stack of items based at least in part on the placement of the item on/among the stack of items (e.g., to reflect the interaction that the particular item has with other items or interaction among other items based on placement of the particular item, etc.).

In some embodiments, the system updates the current state (e.g., updates based on an update to the geometric model) after (i) movement (e.g., placement) of a predetermined number of items, or (ii) the earlier of movement of the predetermined number of items or detection of an anomaly such as an anomaly that satisfies one or more anomaly criteria (e.g., the extent of the anomaly exceeds an anomaly threshold, etc.). The predetermined number of items (e.g., X items, X being a positive integer) can be set based on user preferences, a robot control system policy, or otherwise determined based on empirical analysis of placement of items. As an example, the predetermined number of items is set based on a determination that the number of items results in an optimal/best result with respect to a predetermined cost function (e.g., a cost function reflecting an efficiency, a stability, expected change in stability, etc.). As an example, the system determines a current estimated state and uses the current estimated state to determine a plan for moving the next X items, and after moving the X items (e.g., the stacking or de-stacking of the items), the system determines an updated estimated state (e.g., a geometric update/model to reflect placement of the X items). The system determines the updated state based at least in part on a combination of the geometric model and the sensor data (e.g., a current geometric model and current sensor data, etc.). The system then uses the updated state in connection with determining a plan and controlling a robotic to place a next set of items in accordance with the plan.

In some embodiments, the frequency by which the system updates the estimated state is dynamically determined. For example, the system dynamically determines the value X corresponding to the number of items after movement of which the system updates the estimated state. In some embodiments, the system dynamically determines the value X (e.g., corresponding to an update frequency of the estimated state) based at least in part on one or more attributes of items (e.g., an attribute of a previously moved/placed item, and/or an attribute of an item to be moved). As an example, the system dynamically determines the value X based on a determination that an irregularly placed item or deformable item was placed before (e.g., immediately before, etc.) the set of X items are placed using the current estimated state, or the set of X items comprises an irregularly shaped item or deformable item.

An example of the dynamic determination/update of the estimated state includes (i) controlling a robotic arm to place a first set of X items on or in, or remove the first set of X items from, the pallet or other receptacle, (ii) determining an estimated state (e.g., that reflects the placing/removal of the first set of X items), (iii) using the estimated state to generate or update a plan to control the robotic arm to place a second set of Y items on or in, or remove the second set of Y items from, the pallet or other receptacle, and/or (iv) controlling a robotic arm to place a first set of Y items on or in, or remove the first set of Y items from, the pallet or other receptacle. In some embodiments, the state of the one or more items stacked on or in the pallet or other receptacle is estimated after the N items are stacked.

Although the foregoing example is discussed in the context of a system palletizing a set of items on one or more pallets, the robotic system can also be used in connection with depalletizing a set of items from one or more pallets.

Figure 2:
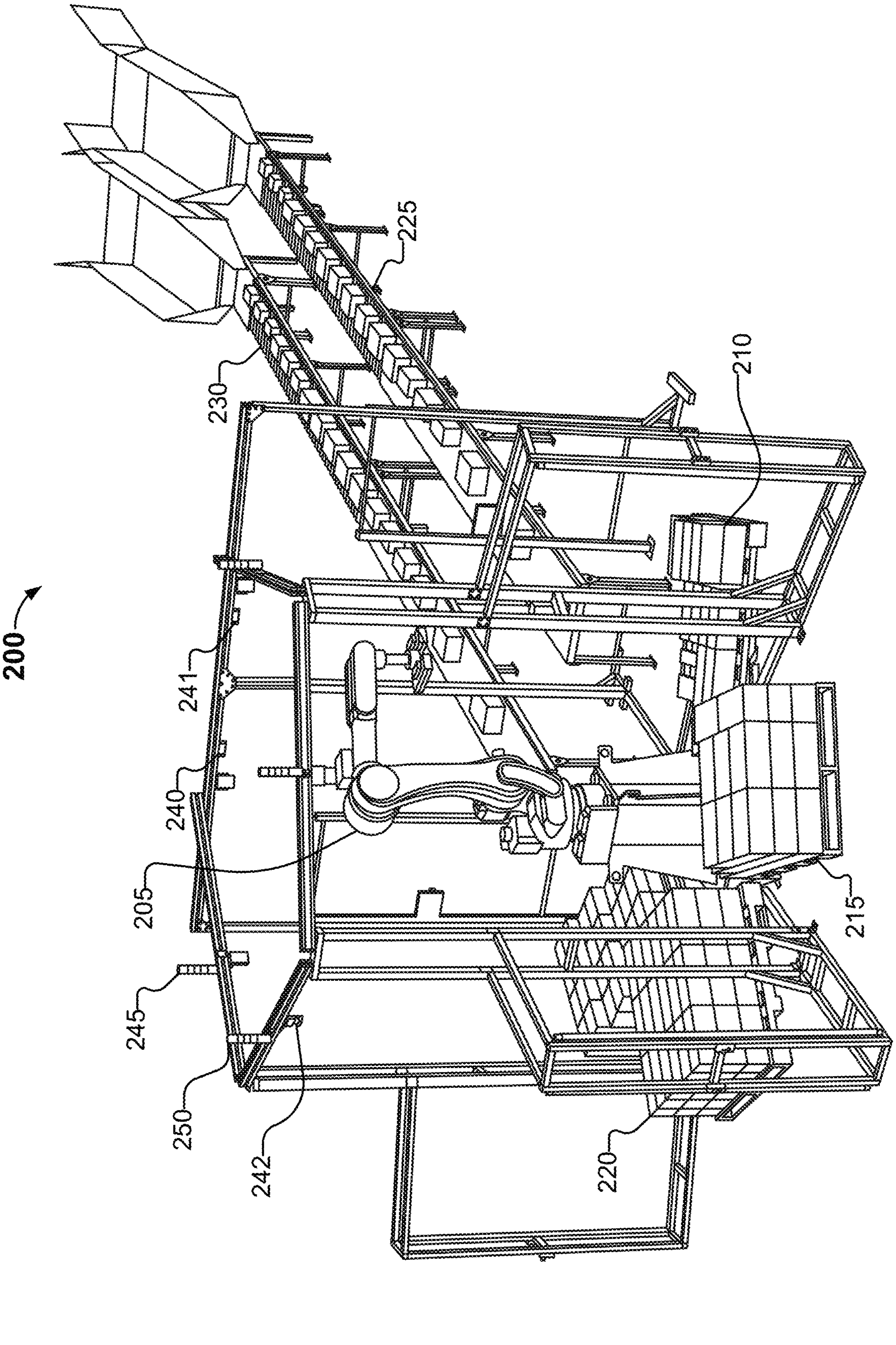
FIG. 2 is a diagram illustrating a robotic system to palletize and/or depalletize heterogeneous items according to various embodiments.

FIG. 2 is a diagram illustrating a robotic system to palletize and/or depalletize heterogeneous items according to various embodiments. In some embodiments, system 200 is implemented at least in part by process 300 of FIG. 3, process 400 of FIG. 4, process 500 of FIG. 5, process 600 of FIG. 6, process 800 of FIG. 8, and/or process 900 of FIG. 9.

In the example shown, system 200 includes a robotic arm 205. In this example the robotic arm 205 is stationary, but in various alternative embodiments, robotic arm 205 may be a fully or partly mobile, e.g., mounted on a rail, fully mobile on a motorized chassis, etc. In other implementations, system 200 may include a plurality of robotic arms with a workspace. As shown, robotic arm 205 is used to pick arbitrary and/or dissimilar items from one or more conveyors (or other source) 225 and 230, and the items on a pallet (e.g., platform or other receptacle) such as pallet 210, pallet 215, and/or pallet 220. In some embodiments, other robots not shown in FIG. 2 may be used to push pallet 210, pallet 215, and/or pallet 220 into position to be loaded/unloaded and/or into a truck or other destination to be transported, etc.

As illustrated in FIG. 2, system 200 may comprise one or more predefined zones. For example, pallet 210, pallet 215, and pallet 220 are shown as located within the predefined zones. The predefined zones may be denoted by marking or labelling on the ground or otherwise structurally such as via the frame shown in system 200. In some embodiments, the predefined zones may be located radially around robotic arm 205. In some cases, a single pallet is inserted into a predefined zone. In other cases, one or more pallets are inserted into a predefined zone. Each of the predefined zones may be located within range of robotic arm 205 (e.g., such that robotic arm 205 can place items on a corresponding pallet, or de-palletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 205 such as via conveyor 225 and/or conveyor 230. System 200 may control a speed of conveyor 225 and/or conveyor 230. For example, system 200 may control the speed of conveyor 225 independently of the speed of conveyor 230, or system 200 may control the speeds of both conveyor 225 and/or conveyor 230. In some embodiments, system 200 may pause conveyor 225 and/or conveyor 230 (e.g., to allow sufficient time for robotic arm 205 to pick and place the items). In some embodiments, conveyor 225 and/or conveyor 230 carries items for one or more manifests (e.g., orders). For example, conveyor 225 and conveyor 230 may carry items for a same manifest and/or different manifests. Similarly, one or more of the pallets/predefined zones may be associated with a particular manifest. For example, pallet 210 and pallet 215 may be associated with a same manifest. As another example, pallet 210 and pallet 220 may be associated with different manifests.

System 200 may control robotic arm 205 to pick an item from a conveyor such as conveyor 225 or conveyor 230, and place the item on a pallet such as pallet 210, pallet 215, or pallet 220. Robotic arm 205 may pick the item and move the item to a corresponding destination location (e.g., a location on a pallet or stack on a pallet) based at least in part on a plan associated with the item. In some embodiments, system 200 determines the plan associated with the item such as while the item is on the conveyor, and system 200 may update the plan upon picking up the item (e.g., based on an obtained attribute of the item such as weight, or in response to information obtained by a sensor in the workspace such as an indication of an expected collision with another item or human, etc.). System 200 may obtain an identifier associated with the item such as a barcode, QR code, or other identifier or information on the item. For example, system 200 may scan/obtain the identifier as the item is carried on the conveyor. In response to obtaining the identifier, system 200 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 200 may select a pallet on which to place the item based at least in part on a model or simulation of the stack of items on the pallet and/or on a placing of the item on the pallet. System 200 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 205 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 200 comprises one or more sensors and/or sensor arrays. For example, system 200 may include one or more sensors within proximity of conveyor 225 and/or conveyor 230 such as sensor 240 and/or sensor 241. The one or more sensors may obtain information associated with an item on the conveyor such as an identifier or information on the label of the item, or an attribute of the item such as dimensions of the item. In some embodiments, system 200 includes one or more sensors and/or sensor arrays that obtain information pertaining to a predefined zone and/or a pallet in the zone. For example, system 200 may include a sensor 242 that obtains information associated with pallet 220 or the predefined zone within which pallet 220 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 200 may generate a model of a stack of items on a pallet based at least in part on the information pertaining to the pallet. System 200 may in turn use the model in connection with determining a plan for placing an item on a pallet. As another example, system 200 may determine that a stack of items is complete based at least in part on the information pertaining to the pallet.

According to various embodiments, system 200 determines a plan for picking and placing an item (or updates the plan) based at least in part on a determination of a stability of a stack on a pallet. System 200 may determine a model of the stack for one or more of pallets 210, 215, and/or 220, and system 200 may use the model in connection with determining the stack on which to place an item. As an example, if a next item to be moved is relatively large (e.g., such that a surface area of the item is large relative to a footprint of the pallet), then system 200 may determine that placing the item on pallet 210 may cause the stack thereon to become unstable (e.g., because the surface of the stack is non-planar). In contrast, system 200 may determine that placing the relatively large (e.g., planar) item on the stack for pallet 215 and/or pallet 220 may result in a relatively stable stack. The top surfaces of the stacks for pallet 215 and/or pallet 220 are relatively planar and the placement of a relatively large item thereon may not result in the instability of the stack. System 200 may determine that an expected stability of placing the item on pallet 215 and/or pallet 220 may be greater than a predetermined stability threshold, or that placement of the item on pallet 215 or pallet 220 may result in an optimized placement of the item (e.g., at least with respect to stability).

System 200 may communicate a state of a pallet and/or operation of the robotic arm 205 within a predefined zone. The state of the pallet and/or operation of the robotic arm may be communicated to a user or other human operator. For example, system 200 may include a communication interface (not shown) via which information pertaining to the state of system 200 (e.g., a state of a pallet, a predetermined zone, a robotic arm, etc.) is communicated to a terminal such as an on-demand teleoperation device and/or a terminal used by a human operator. As another example, system 200 may include a status indicator within proximity of a predefined zone, such as status indicator 245 and/or status indicator 250.

Status indicator 250 may be used in connection with communicating a state of a pallet and/or operation of the robotic arm 205 within the corresponding predefined zone. For example, if system 200 is active with respect to the predefined zone in which pallet 220 is located, the status indicator can so indicate such as via turning on a green-colored light or otherwise communicating information or an indication of the active status via status indicator 250. System 200 may be determined to be in an active state with respect to a predefined zone in response to determining that robotic arm 205 is actively palletizing one or more items on the pallet within the predefined zone. As another example, if system 200 is inactive with respect to the predefined zone in which pallet 220 is located, the status indicator can so indicate such as via turning on a red-colored light or otherwise communicating information or an indication of the active status via status indicator 250. System 200 may be determined to be inactive in response to a determination that robotic arm 205 is not actively palletizing one or more items on the pallet within the predefined zone, for example, in response to a user pausing that predefined zone (or cell), or in response to a determination that a palletization of items on pallet 220 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 200 may use information obtained by one or more sensors within the workspace to determine an abnormal state pertaining to the pallet and/or items stacked on the pallet. For example, system 200 may determine that a pallet is misaligned relative to robotic arm 205 and/or the corresponding predefined zone based at least in part on the information obtained by the sensor(s). As another example, system 200 may determine that a stack is unstable, that items on a pallet are experiencing a turbulent flow, etc. based at least in part on the information obtained by the sensor(s). In response to detecting the abnormal state, the system may communicate an indication of the abnormal state such as an on-demand teleoperation device or other terminal used by an operator. In some embodiments, in response to detecting the abnormal state, system 200 may automatically set the pallet and/or corresponding zone to an inactive state. In addition to, or as an alternative to, notifying an operator of the abnormal state, system 200 may perform an active measure. The active measure may include controlling the robotic arm 205 to at least partially correct the abnormal state (e.g., restack fallen items, realign the pallet, etc.). In some implementations, in response to detecting that an inserted pallet is misaligned (e.g., incorrectly inserted to the predefined zone), system 200 may calibrate the process for modelling a stack and/or for placing items on the pallet to correct for the misalignment. For example, system 200 may generate and use an offset corresponding to the misalignment when determining and implementing a plan for placing an item on the pallet. In some embodiments, system 200 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 200 via a network such as a wired network and/or a wireless network. For example, system 200 may comprise a communication interface via which system 200 is connected to one or more networks. In some embodiments, a terminal connected via network to system 200 provides a user interface via which a human operator can provide instructions to system 200, and/or via which the human operator may obtain information pertaining to a state of system 200 (e.g., a state of the robotic arm, a state of a particular pallet, a state of a palletization process for a particular manifest, etc.). The human operator may provide an instruction to system 200 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In various embodiments, elements of system 200 may be added, removed, swapped out, etc. In such an instance, a control computer initializes and registers the new element, performs operational tests, and begins/resumes kitting operations, incorporating the newly added element, for example.

According to various embodiments, system 200 determines (e.g., computes, maintains, stores, etc.) an estimated state for each pallet in the plurality of zones (e.g., pallet 210, pallet 215, and/or pallet 220), or an aggregated estimated state for the set of pallets among the plurality of zones, or both individual estimated states and an aggregated estimated state. In some embodiments, the individual estimated states and an aggregated estimated state are determined similar to the estimated state described in connection with robotic system 100 of FIG. 1.

According to various embodiments, system 200 comprises a vision system comprising one or more sensors (e.g., sensor 240, sensor 241, etc.). In various embodiments, system 200 uses sensor data and geometric data (e.g., a geometric model) in connection with determining a location to place one or more items on a pallet (or in connection with depalletizing one or more items from a pallet). System 200 uses different data sources to model the state of a pallet (or a stack of items on a pallet). For example, system 200 may estimate locations of one or more items on the pallet(s) and one or more characteristics (or attributes) associated with the one or more items (e.g., a size of the item(s)). The one or more characteristics associated with the one or more items may include an item size (e.g., dimensions of the item), a center of gravity, a rigidity of the item, a type of packaging, a location of an identifier, etc.

System 200 determines the geometric model based at least in part on one or more attributes for one or more items in the workspace. For example, the geometric model reflects respective attributes of a set of items (e.g., one or more of a first set that are palletized/stacked, and a second set of items that is to be palletized/stacked, etc.). Examples of an item include an item size (e.g., dimensions of the item), a center of gravity, a rigidity of the item, a type of packaging, a location of an identifier, a deformability of the item, a shape of the item, etc. Various other attributes of an item or object within the workspace may be implemented.

The model generated by system 200 can correspond to, or be based at least in part on, a geometric model. In some embodiments, system 200 generates the geometric model based at least in part on one or more items that have been placed (e.g., items for which system 200 controlled robotic arm 205 to place), one or more attributes respectively associated with at least a subset of the one or more items, one or more objects within the workspace (e.g., predetermined objects such as a pallet, a robotic arm(s), a shelf system, a chute, or other infrastructure comprised in the workspace), etc. The geometric model can be determined based at least in part on running a physics engine on the control computer to model a stacking of items (e.g., models a state/stability of a stack of items, etc.). The geometric model can be determined based on an expected interaction of various components of the workspace, such as an item with another item, an object, a simulated force applied to the stack (e.g., to model the use of a forklift or other device to raise/move a pallet or other receptacle on which a stack of items is located), etc.

According to various embodiments, system 200 uses the geometric model and the sensor data to determine a best estimate of a state of the workspace. System 200 can adjust for (e.g., cancel) noise in one or more of the geometric model and/or sensor data. In some embodiments, system 200 detects anomalies or differences between a state according to the geometric model and a state according to the sensor data. In response to determining an anomaly or difference between the geometric model and the sensor data, system 200 can make a best estimate of the state notwithstanding the anomaly or difference. For example, system 200 determines whether to use the geometric model or the sensor data, or a combination of (e.g., an interpolation between) the geometric model and the sensor data, etc. In some embodiments, system 200 determines the estimated state on a segment-by-segment basis (e.g., a voxel-by-voxel basis in the workspace, an item-by-item basis, or an object-by-object basis, etc.). For example, a first part of the workspace may be estimated using only the geometric model, a second part of the workspace may be estimated using only the sensor data (e.g., in the event of an anomaly in the geometric model), and/or a third part of the workspace may be estimated based on a combination of the geometric model and the sensor data. Using the example illustrated in FIG. 2, system 200 in connection with determining an aggregated estimated state may use only the geometric model to determine the individual estimated state for the stack of items on pallet 210, use only sensor data to determine the individual estimated state for the stack of items on pallet 215, and use a combination of the respective geometric model and sensor data for the stack of items on pallet 220.

Although the foregoing example is discussed in the context of a system palletizing a set of items on one or more pallets, the robotic system can also be used in connection with depalletizing a set of items from one or more pallets.

Figure 3:
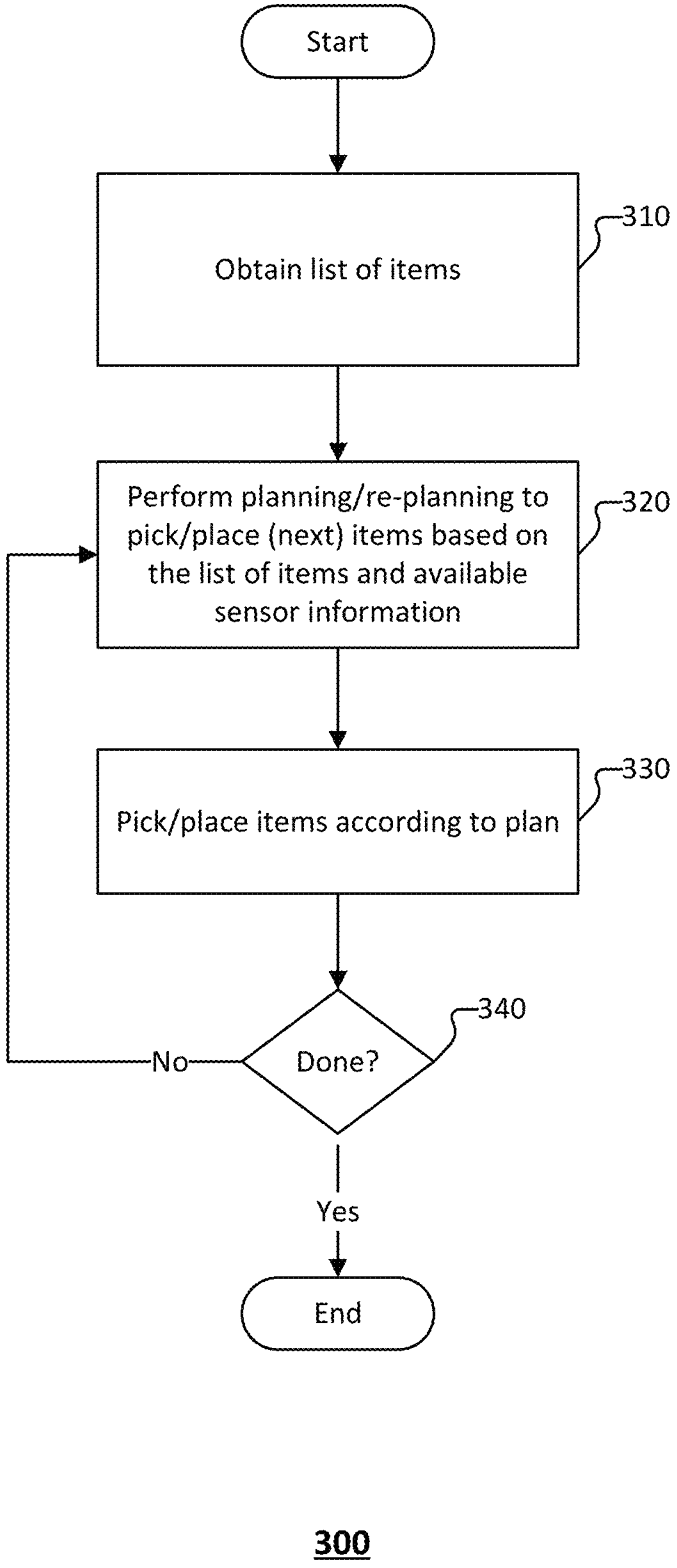
FIG. 3 is a flow chart illustrating a process to palletize one or more items according to various embodiments.

FIG. 3 is a flow chart illustrating a process to palletize one or more items according to various embodiments. In some embodiments, process 300 is implemented at least in part by robotic system 100 of FIG. 1 and/or system 200 of FIG. 2.

At 310, a list of items is obtained. The list of items may correspond to a set of items that are to be collectively palletized on one or more pallets. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

The items may be located on a shelf or other location within a warehouse. In order to palletize the items, the items are moved to a robotic system that palletizes the items. For example, the items may be placed on one or more conveyors that move the items to within range of one or more robotic arms that palletize the items onto one or more pallets. In response to obtaining the list of items, at least some of the items are associated with a particular robotic arm, a predefined zone corresponding to the particular robotic arm, and/or a particular pallet (e.g., a pallet identifier, a pallet located in a predefined zone), etc.

At 320, planning (or re-planning) is performed to generate a plan to pick/place items based on the list of items and available sensor information. The plan may include one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

The order in which the items are placed on the conveyor may be at least loosely based on the items and an expected stack of the items on one or more pallets. For example, the system determining the order in which to place the items on the conveyor may generate a model of an expected stack(s) of the items, and determine the order based on the model (e.g., so as to first deliver items that form the base/bottom of the stack and progressively deliver items higher up the stack). In the case that the items on the list of items are to be palletized on a plurality of pallets, items that are expected to form the base/bottom of the respective stacks (or otherwise be relatively near the bottom of the stacks) may be placed on the conveyor before items that are expected to be substantially in the middle or top of the stacks. Various items that are to be palletized on the plurality of pallets may be interspersed among each other and the robotic system may sort the items upon arrival at the robotic arm (e.g., the robotic arm may pick and place the items onto an applicable pallet based at least on the item such as the identifier of the item or an attribute of the item). Accordingly, the items corresponding to the base/bottom portion of the corresponding stacks may be interspersed among each other and various items for each pallet/stack may be placed on the conveyor as the corresponding stack is built.

The computer system may generate a model of one or more expected stacks for the items belonging to the list of items. The model may be generated based at least in part on one or more thresholds such as a fit threshold value or stability threshold value, other packing metric (e.g., density), etc. For example, the computer system can generate a model of a stack for which an expected stability value satisfies (e.g., exceeds) the stability threshold value. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) for palletizing the items on the list of items is generated based at least in part on one or more attributes of the items.

Various attributes of an item may be obtained before or during the determining of the plan. Attributes may include a size of an item, a shape of an item, a type of packaging of an item, an identifier of an item, a center of gravity of an item, an indication of whether the item is fragile, an indication of a top or bottom of the item, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

In some embodiments, the generating the model of one or more expected stats for the items belonging to the list of items includes generating (e.g., determining) an estimated state for the workspace (e.g., a workspace comprising one or more stacks of items). The computer system determines a plan for moving (e.g., palletizing or depalletizing, etc.) a set of one or more items, and the computer system controls a robot (e.g., a robotic arm) to move the set of one or more items according to the plan. In response to moving the set of one or more items according to the plan, the computer system determines an estimated state for the workspace. For example, the computer system updates the estimated state based at least in part on the movement of the set of items. In some embodiments, the estimated state is determined based at least in part on the geometric model or the sensor data, or a combination of the geometric model and the sensor data in response to a determination that the geometric model and the sensor data are incongruent (e.g., that a difference between the geometric model and the sensor data is greater than a predetermined difference threshold, or comprise an anomaly, etc.). The updated/current estimated state reflects the movement of the set of one or more items (e.g., in the case of palletizing, the updated estimated state includes information pertaining to the placement of the set of one or more items on the stack(s), etc.). In response to determining the updated/current estimated state, the computer system determines a plan for moving another set of one or more items, and the computer system controls the robot to move the other set of one or more items according to the plan.

In some embodiments, the computer system updates the current state (e.g., updates based on an update to the geometric model) after (i) movement (e.g., placement) of a predetermined number of items, or (ii) the earlier of movement of the predetermined number of items or detection of an anomaly such as an anomaly that satisfies one or more anomaly criteria (e.g., the extent of the anomaly exceeds an anomaly threshold, etc.). The predetermined number of items (e.g., X items, X being a positive integer) can be set based on user preferences, a robot control system policy, or otherwise determined based on empirical analysis of placement of items. As an example, the predetermined number of items is set based on a determination that the number of items results in an optimal/best result with respect to a predetermined cost function (e.g., a cost function reflecting an efficiency, a stability, expected change in stability, etc.). As an example, the computer system determines a current estimated state and uses the current estimated state to determine a plan for moving the next X items, and after moving the X items (e.g., the stacking or de-stacking of the items), the computer system determines an updated estimated state (e.g., a geometric update/model to reflect placement of the X items). The computer system determines the updated state based at least in part on a combination of the geometric model and the sensor data (e.g., a current geometric model and current sensor data, etc.). The computer system then uses the updated state in connection with determining a plan and controlling a robotic to place a next set of items in accordance with the plan.

According to various embodiments, the computer system determines the estimated state based at least in part on performing an interpolation between the geometric model and the sensor data. For example, the system performs the interpolation for a particular part of a geometric model and a corresponding part of the sensor data (e.g., the particular part may correspond to a difference between the geometric model and the sensor data that exceeds a difference threshold, or comprises an anomaly).

Various interpolation techniques may be implemented. The particular part of the geometric model may correspond to a particular point (or set of points) in the point cloud for the geometric model, and the corresponding part of the sensor data may be the sensor data for that particular point in the point cloud for the sensor data, etc. In some embodiments, the system performs an adaptive interpolation between the geometric model and the sensor data. In some embodiments, the system performs a non-adaptive interpolation between the geometric model and the sensor data. Examples of adaptive interpolation processing include: nearest neighbor, bilinear, bicubic, spline, sinc, lanczos, etc. Various other interpolation processing may be performed in connection with determining an estimated state.

At 330, items are picked and moved through a (predetermined/planned) trajectory to a location near where the item is to be placed on the corresponding conveyor, and placed at the destination location according to the plan determined and/or updated at 320.

In the example shown, (re-)planning and plan implementation (320, 330) continue until the high level objective of providing the items on the list of items is completed (340), at which the process 300 ends. In various embodiments, re-planning (320) may be triggered by conditions such as the arrival of items that are not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 4:
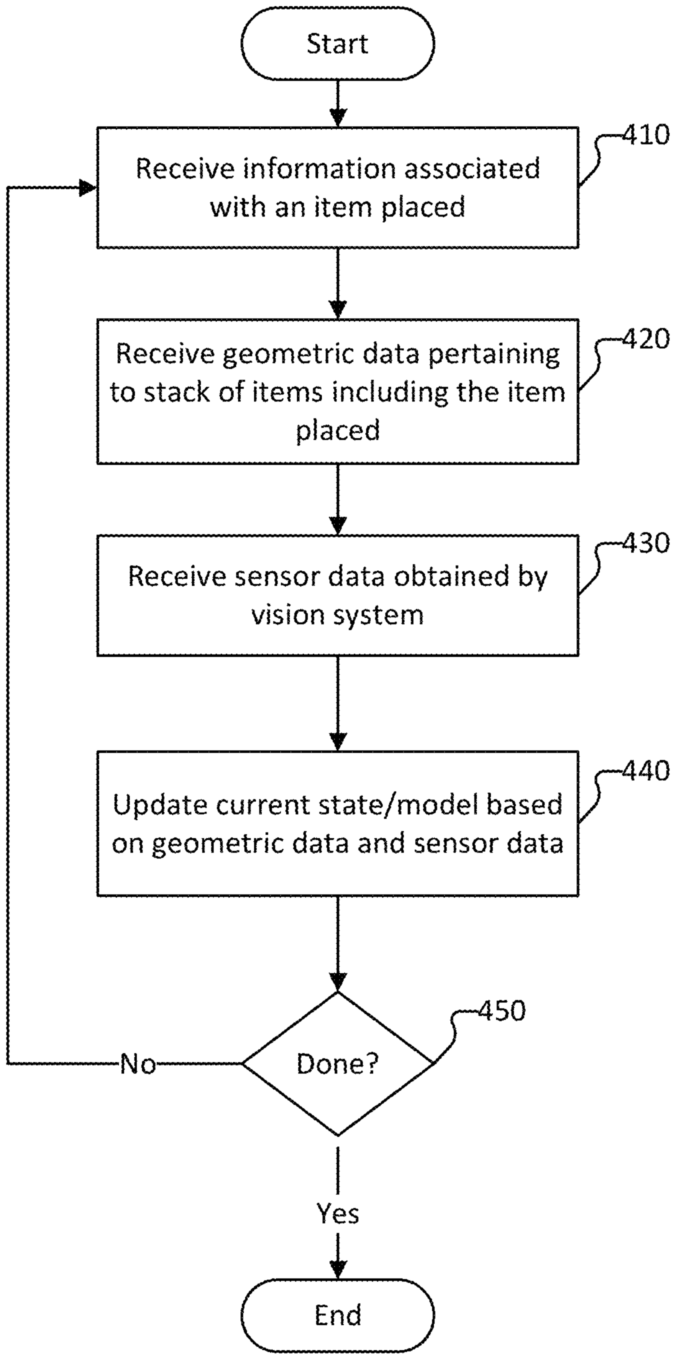
FIG. 4 is a flow chart illustrating a process to determine a current state of a pallet and/or stack of items according to various embodiments.

FIG. 4 is a flow chart illustrating a process to determine a current state of a pallet and/or stack of items according to various embodiments. In some embodiments, process 400 is implemented at least in part by robotic system 100 of FIG. 1 and/or system 200 of FIG. 2.

According to various embodiments, process 400 is invoked in response to a determination that the system is to determine a plan for moving one or more items. In some embodiments, process 400 is invoked with respect to placement of each item in a set of items to be stacked. In some embodiments, process 400 is invoked at a predetermined frequency/interval, such as after a predetermined number of items have been moved since a last determination of the estimated state. In addition to any of the foregoing, the system may invoke process 400 based at least in part on an attribute of an item previously placed or an item currently being placed. For example, process 400 is invoked in response to a determination that the previously placed item or current item has an irregular shape (e.g., a size/dimension exceeding a threshold size, a non-rectangular shape, etc.) and/or is deformable (e.g., the item has an expected deformability that exceeds a deformability threshold, or the item has soft packaging such as a polybag, etc.). As another example, the system invokes process 400 in response to a determination that a previously placed item or a current item to be placed may cause an instability (e.g., a threshold instability) among the stack of items.

At 410, information associated with an item(s) placed is obtained. The system obtains the information associated with the item based on pre-stored information associated with the item (e.g., if the item is pre-known such as on a manifest to be palletized) or based on information obtained by the vision system (e.g., an item identifier, a size, a type of packaging, a weight, etc.). The information associated with the item placed can correspond to an attribute of the item, etc.

At 420, geometric data pertaining to a stack of items comprising the item placed is received. In some embodiments, the system obtains the current geometric model, which has been updated to reflect placement of the item. The current geometric model may be the estimated state used in connection with determining placement of the item or placement of a set of items to which the item belongs (e.g., an expected placement based on operation of a robot to place the item(s) according to plan).

At 430, sensor data obtained by a vision system is obtained. In some embodiments, the system obtains the sensor data obtained by the vision system. For example, the system instructs the vision system to capture a current state of the workspace, and the system uses information pertaining to such capture to obtain the sensor data.

At 440, a current state or model is updated based at least in part on the geometric data and the sensor data. The system determines an expected state based at least in part on the geometric model or the sensor data, or both the geometric model and the sensor data such as in response to a determination of a difference between the geometric model and the sensor data.

According to various embodiments, the system determines the estimated state (e.g., an updated estimated state) at least in part by performing an interpolation based on at least part of the geometric model and at least part of the sensor data. In some embodiments, an interpolation process performed with respect to a first part of the geometric model and a first part of the sensor data to obtain a first part of the estimated state is different from an interpolation performed with respect to a second part of the geometric model and a second part of the sensor data to obtain a second part of the estimated sate.

In some embodiments, the system uses the updated estimated state in connection with determining a plan for moving one or more items and controlling a robot to move the one or more items according to the plan.

At 450, a determination is made as to whether process 400 is complete. In some embodiments, process 400 is determined to be complete in response to a determination that no further updating of the estimated state is to be performed, no further items are to be moved, a user has exited the system, an administrator indicates that process 400 is to be paused or stopped, etc. In response to a determination that process 400 is complete, process 400 ends. In response to a determination that process 400 is not complete, process 400 returns to 410.

Figure 5:
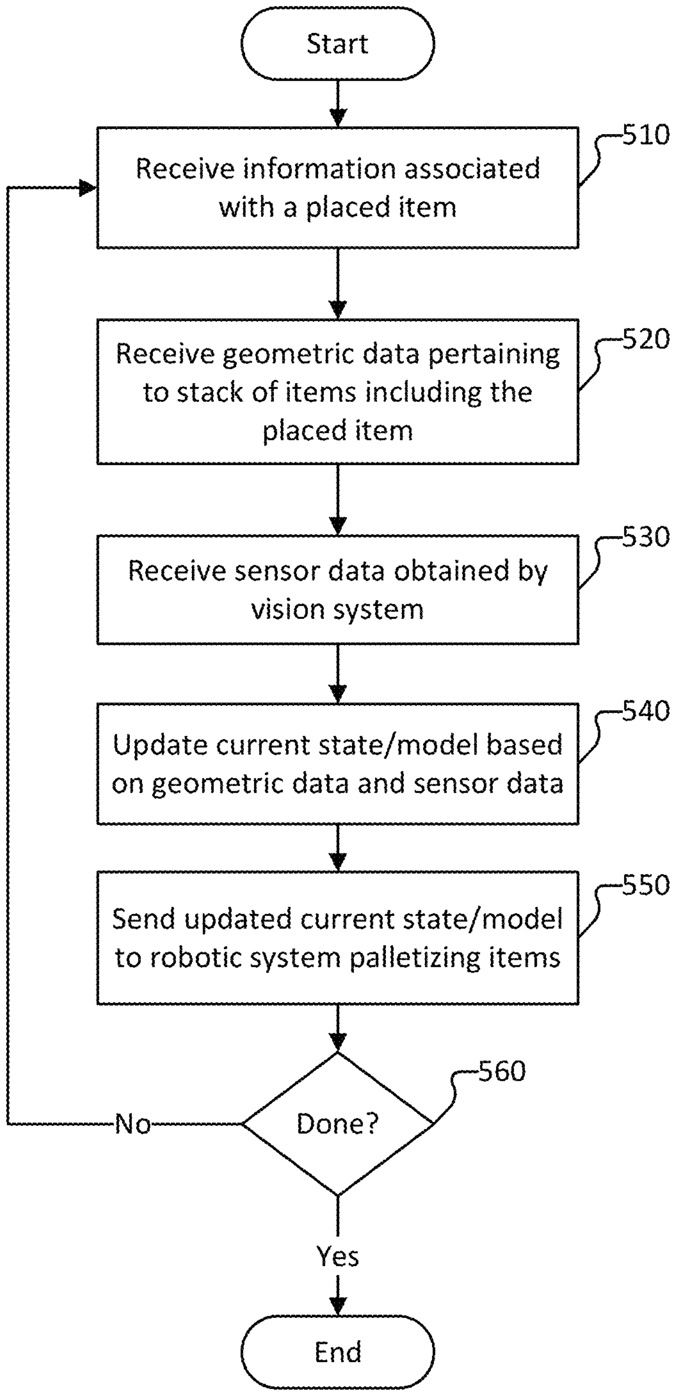
FIG. 5 is a flow chart illustrating a process to determine a current state of a pallet and/or stack of items according to various embodiments.

FIG. 5 is a flow chart illustrating a process to determine a current state of a pallet and/or stack of items according to various embodiments. In some embodiments, process 500 is implemented at least in part by robotic system 100 of FIG. 1 and/or system 200 of FIG. 2.

According to various embodiments, process 500 is invoked in response to a determination that the system is to determine a plan for moving one or more items. In some embodiments, process 500 is invoked with respect to placement of each item in a set of items to be stacked. In some embodiments, process 500 is invoked at a predetermined frequency/interval, such as after a predetermined number of items have been moved since a last determination of the estimated state. In addition to any of the foregoing, the system may invoke process 500 based at least in part on an attribute of an item previously placed or an item currently being placed. For example, process 500 is invoked in response to a determination that the previously placed item or current item has an irregular shape (e.g., a size/dimension exceeding a threshold size, a non-rectangular shape, etc.) and/or is deformable (e.g., the item has an expected deformability that exceeds a deformability threshold, or the item has soft packaging such as a polybag, etc.). As another example, the system invokes process 500 in response to a determination that a previously placed item or a current item to be placed may cause an instability (e.g., a threshold instability) among the stack of items.

According to various embodiments, process 500 is performed by one or more servers that provide a service to one or more robotic systems that move items (e.g., palletization/depalletization systems, singulation systems, kitting systems, etc.). For example, the system receives queries from one or more robotic systems to provide an estimated state. The system may maintain a current estimated state of one or more stacks of items (e.g., based on operation of robotic systems that pick and place items with respect to the stack of items, and/or based on sensor data).

At 510, information associated with a placed item(s) is received. In some embodiments, the system obtains the information associated with the item based on pre-stored information associated with the item. For example, the system performs (e.g., based on an identifier associated with the item) a lookup with respect to a mapping of attributes to items. In some embodiments, the information associated with the placed item is received based at least in part on attributes for the item that were obtained by one or more sensors (e.g., the vision system) when placing the item (e.g., a rigidity/deformability of the item or packaging, a size, a weight, etc.).

At 520, geometric data pertaining to a stack of items comprising the placed item is received. In some embodiments, the system obtains the current geometric model, which has been updated to reflect placement of the item. The current geometric model can correspond to an expected state of a stack of items (e.g., a state of the stack of items whereby the system assumes that the item(s) were placed precisely in accordance with the plan, etc.). For example, the system obtains the geometric model used in connection with determining the plan to move the placed item (or set of items to which the placed item belongs), and the system updates the geometric model to reflect placement of the placed item.

At 530, sensor data obtained by a vision system is obtained. In some embodiments, the system obtains the sensor data obtained by the vision system. For example, the system instructs the vision system to capture a current state of the workspace, and the system uses information pertaining to such capture to obtain the sensor data.

At 540, a current state or model is updated based at least in part on the geometric data and the sensor data. The system determines an expected state based at least in part on the geometric model or the sensor data, or both the geometric model and the sensor data such as in response to a determination of a difference between the geometric model and the sensor data.

According to various embodiments, the system determines the estimated state (e.g., an updated estimated state) at least in part by performing an interpolation based on at least part of the geometric model and at least part of the sensor data. In some embodiments, an interpolation process performed with respect to a first part of the geometric model and a first part of the sensor data to obtain a first part of the estimated state is different from an interpolation performed with respect to a second part of the geometric model and a second part of the sensor data to obtain a second part of the estimated sate.

In some embodiments, the updated estimated state is used in connection with determining a plan for moving one or more items and controlling a robot to move the one or more items according to the plan.

At 550, the updated current state or model is provided to a robotic system. In some embodiments, in response to determining the estimated state (e.g., an initial estimated state or an updated estimated state based on previous pick/placement of items), the system provides the estimated state to a robotic system that uses the estimated state to determine a plan to move one or more other items. In some embodiments, the system provides the estimated state in response to a request from the robotic system. For example, the system comprises one or more servers (e.g., remote servers) that provide a service to one or more robotic systems that move items (e.g., palletization/depalletization systems, singulation systems, kitting systems, etc.).

At 560, a determination is made as to whether process 500 is complete. In some embodiments, process 500 is determined to be complete in response to a determination that no further updating of the estimated state is to be performed, no further items are to be moved, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
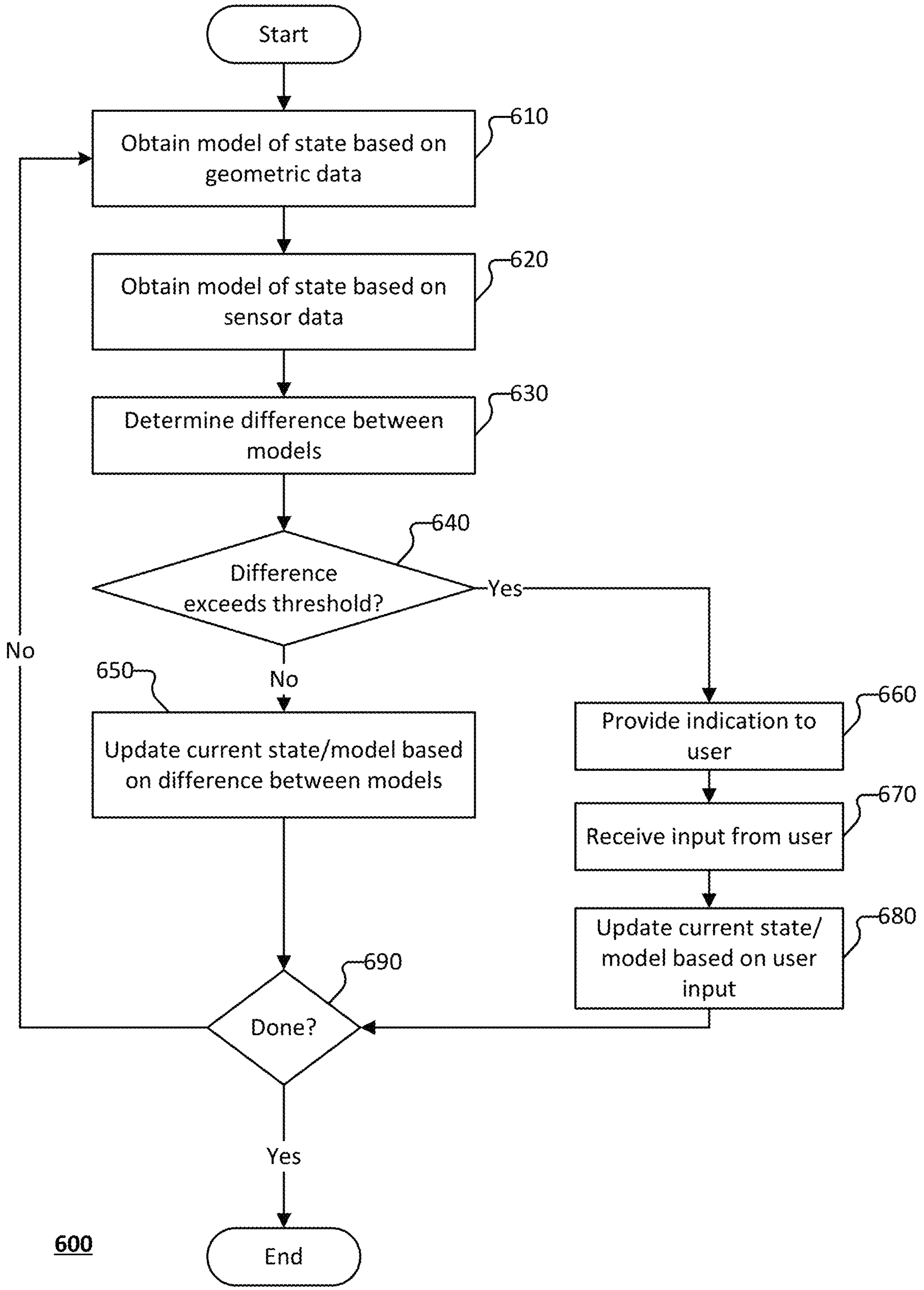
FIG. 6 is a flow chart illustrating a process to determine a current state of a pallet and/or stack of items according to various embodiments.

FIG. 6 is a flow chart illustrating a process to determine a current state of a pallet and/or stack of items according to various embodiments. In some embodiments, process 600 is implemented at least in part by robotic system 100 of FIG. 1 and/or system 200 of FIG. 2.

At 610, a model of a state is obtained based on geometric data. In some embodiments, the system obtains a current geometric model of the system. For example, the system updates a previous geometric model to include movement of items (e.g., placement of items on the stack, removal of an item from a stack, etc.) that the system has controlled a robotic arm to perform since a time at which the previous geometric model/estimated state was determined.

At 620, a model of the state is obtained based on sensor data. The system obtains the sensor data based on information captured by one or more sensors comprised in the workspace (e.g., by the vision system).

At 630, a difference between the model based on geometric data and the model based on sensor data is determined. The system computes a difference between the geometric model and the sensor data, or qualitatively determines a difference between the geometric middle sensor data, etc. For example, the system computes a difference between locations/boundaries of various items among a stack of items. As another example, the system determines whether an item is comprised in one of the geometric model and the sensor data, and missing in the other of the geometric model and the sensor data, such as in the case that a field of view of the vision system is blocked, or an item has toppled from the stack of items (e.g., which was neither anticipated nor reflected in the geometric model), etc.

At 640, a determination of whether the difference exceeds a predetermined threshold is determined. In some embodiments, the system compares the difference between the geometric model and the sensor data to a predetermined difference threshold. The predetermined difference threshold can correspond to an anomaly for which interpolation or combination of geometric data and sensor data is not expected to resolve (e.g., an anomaly that the system deems to require human intervention).

In response to a determination that the difference does not exceed the predetermined threshold at 640, process 600 proceeds to 650 at which a current model or state is updated based at least in part on the difference between the model determined based on geometric data and the model determined based on the sensor data.

In response to a determination that the difference exceeds the predetermined threshold at 640, process 600 proceeds to 660 at which an indication is provided to a user. For example, in response to determining that a difference exceeds the predetermined threshold, the system determines to invoke manual human intervention. The system can prompt the user to confirm whether to use the geometric model or the sensor data, a combination of the geometric model and the sensor data, or neither (e.g., to use a user defined aspect of r model, etc.).

In some embodiments, the indication provided to the user is an indication of a difference between the geometric model and the model based on sensor data with respect to a part of the workspace, such as a part of a stack of items. For example, the indication indicates a particular part of the stack of items for which the difference between the geometric model portion the sensor data exceeds a predetermined threshold.

In some embodiments, the indication provided to the user is an indication of a difference with respect to an entire workspace (e.g., the entire geometric model and the entire sensor data). For example, the system prompts a user to clarify an anomaly manifested between the geometric model and the sensor data for the workspace. As another example, the system prompts the user to define a bias or weighting to be applied with respect to the geometric model and the sensor data. As a further example, the system prompts the user to define an interpolation process to implement in connection with determining an estimated state based on both the geometric model and the sensor data.

At 670, input is received from the user. The user input can be a selection to use the geometric model or the sensor data, or a combination of the geometric model and the sensor data. In some embodiments, the user defines whether to use the geometric model or the sensor data for a particular part of the workspace state (e.g., a top of a stack of items, a part of the stack of items for which a vision system's field of view is blocked, etc.).

At 680, the current state/model is updated based at least in part on the user input. For example, the estimated state is updated to reflect a user selection of whether the geometric model or the sensor data, or a combination of the geometric model and the sensor data are to be used as ground truth for the current state/model.

At 690, a determination is made as to whether process 600 is complete. In some embodiments, process 600 is determined to be complete in response to a determination that no further updating of the estimated state is to be performed, no further items are to be moved, a user has exited the system, an administrator indicates that process 600 is to be paused or stopped, etc. In response to a determination that process 600 is complete, process 600 ends. In response to a determination that process 600 is not complete, process 600 returns to 610.

Figure 7A:
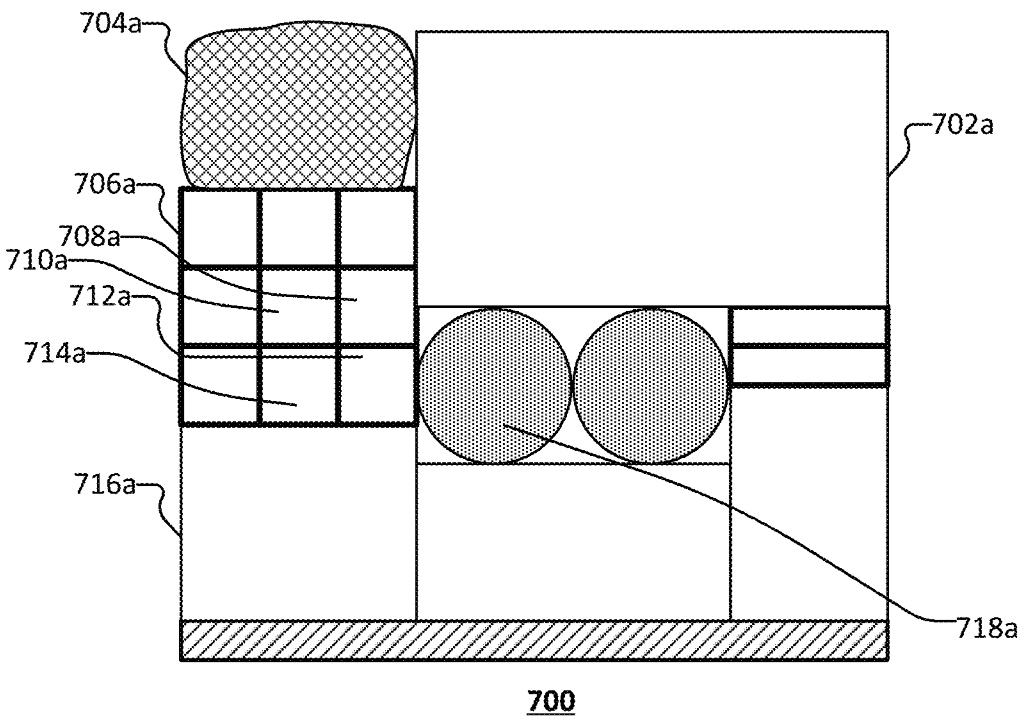
FIG. 7A is a diagram of a state of a pallet/stack of items using geometric data according to various embodiments.
Figure 7B:
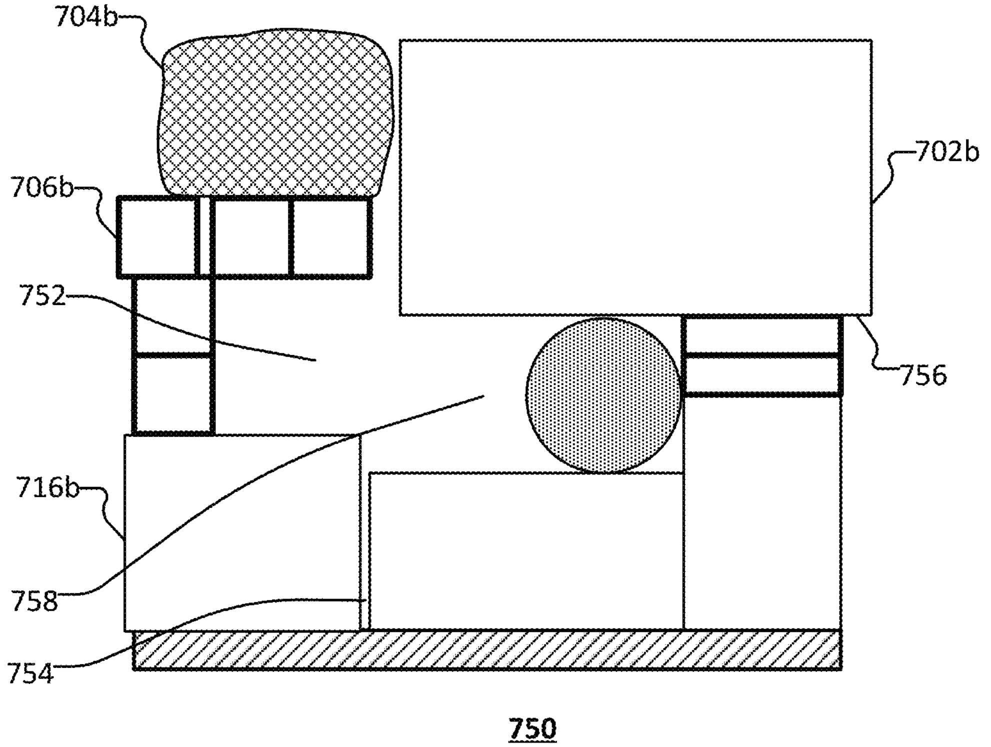
FIG. 7B is a diagram of a state of a pallet/stack of items using a vision system or sensor data according to various embodiments.

FIG. 7A is a diagram of a state of a pallet/stack of items using geometric data according to various embodiments. FIG. 7B is a diagram of a state of a pallet/stack of items using a vision system or sensor data according to various embodiments.

State 700 corresponds to a state of a stack of items according to geometric data. For example, state 700 corresponds to the geometric model of the stack of items. As illustrated in FIG. 7A, the geometric model comprises precisely placed items. The geometric model can correspond to an idealized state of the stack of items if the robotic arm picked/placed items with respect to the stack of items in accordance with a plan (e.g., with no deviation from the plan as modeled, etc.).

State 750 corresponds to a state of a stack of items according to sensor data. For example, state 750 corresponds to the stack of items based on information captured by a vision system comprised in the workspace. As illustrated in FIG. 7B, state 750 comprises imprecisely placed items or parts of the stack of items for which no information is provided (e.g., parts of the stack for which the field of view of the vision system is blocked, etc.).

As illustrated in FIG. 7A, state 700 comprises item 704*a* stacked on top of a set of items comprising item 706*a*, item 708*a*, item 710*a*, item 712*a*, and item 714*a*. However, state 750 has a void 752 at which the sensor data does not reflect the presence of any items. As an example, a void in a stack of items may be comprised in the sensor data in the case that the sensor data is very noisy or the field of view of the vision system is blocked with respect to such part of the workspace. In other words, the sensor data for state 750 does not include information pertaining to items 708*a*, 710*a*, 712*a*, and 714*a*, which are included in the geometric model. If the sensor data were used or had a strong bias rather than the geometric model, then the system may determine that the stack of items has an instability, based on the placement of item 704*b* over items not supported by void 752.

State 700 comprises item 706*a*, which appears to be precisely placed with respect to the various other items of the stack of items. In contrast, state 750 comprises item 706*b*, which is not precisely/squarely placed on the item thereunder. For example, the sensor data reflects a space between item 706*b* and an adjacent item. Examples for the cause of location/placement of item 706*b* include (i) movement of the item after placement by a robotic arm or an inaccurate placement of the item by the robotic arm (e.g., relative to the plan determined according to the then-current estimated state), (ii) imprecise placement of the item by the robotic arm, (iii) noise in the sensor data, and/or (iv) imprecision in the sensor data.

State 700 comprises item 716*a*, which appears to be precisely placed with respect to the various other items of the stack of items. In contrast, state 750 comprises item 716*b*, which is not precisely placed with respect to the adjacent item. For example, the sensor data reflects void 754 between item 716*b* and an adjacent item. Examples for the cause of location/placement of item 716*b* include (i) movement of the item after placement by a robotic arm or an inaccurate placement of the item by the robotic arm (e.g., relative to the plan determined according to the then-current estimated state), (ii) imprecise placement of the item by the robotic arm, (iii) noise in the sensor data, and/or (iv) imprecision in the sensor data.

State 700 comprises item 718*a*, which appears to be precisely placed with respect to the various other items of the stack of items. In contrast, state 750 comprises a void 758 at the same location of the stack as the geometric model comprises item 718*a*. For example, the sensor data reflects void 758 under item 702*b* and an adjacent item. Examples for the cause of void 758 include (i) movement of the item after placement by a robotic arm or an inaccurate placement of the item by the robotic arm (e.g., relative to the plan determined according to the then-current estimated state), (ii) imprecise placement of the item by the robotic arm, (iii) noise in the sensor data, and/or (iv) imprecision in the sensor data. If the system uses the sensor data for the part of the stack of the item corresponding to void 758, then the system may deem the stack of items to be unstable. For example, the system may deem item 702*b* to be partially unsupported and subject to instability.

State 700 comprises item 702*a*, which appears to be precisely placed with respect to the various other items of the stack of items. In contrast, state 750 comprises item 702*b*, which is not precisely/squarely placed on the items thereunder. For example, the sensor data reflects an offset (e.g., an overhang) of item 702*b* with respect to the item(s) beneath item 702*b*. Examples for the cause of offset 756 include (i) movement of the item after placement by a robotic arm or an inaccurate placement of the item by the robotic arm (e.g., relative to the plan determined according to the then-current estimated state), (ii) imprecise placement of the item by the robotic arm, (iii) noise in the sensor data, and/or (iv) imprecision in the sensor data.

Figure 7C:
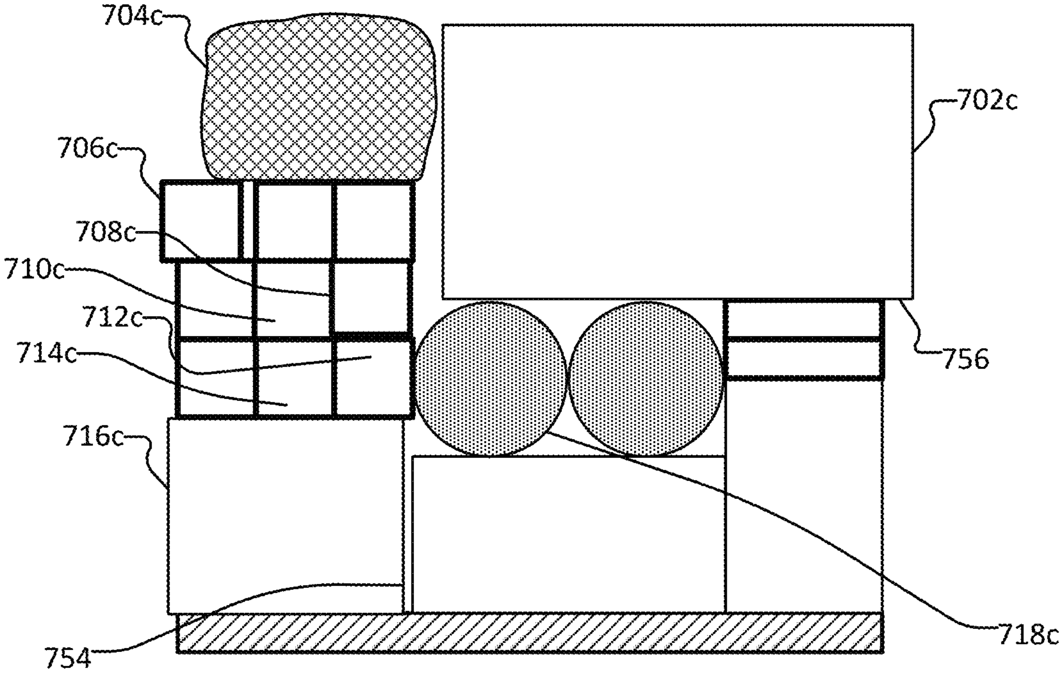
FIG. 7C is a diagram of a state of a pallet/stack of items using geometric data and a vision system or sensor data according to various embodiments.

FIG. 7C is a diagram of a state of a pallet/stack of items using geometric data and a vision system or sensor data according to various embodiments.

As illustrated in FIG. 7C, estimated state 775 comprises a state of the stack of items based on a combination of the geometric model (e.g., state 700) and the sensor data (e.g., state 750). In some embodiments, the system determines the difference(s) between the geometric model and the sensor data, and determines how the differences are to be reflected in the estimated state. For example, with respect to a difference for a particular part of the stack of items, the system determines whether to (i) solely use the geometric model for modelling the particular part of the stack in the estimated state, (ii) solely use the sensor data for modelling the particular part of the stack in the estimated state, or (iii) use a combination of the geometric model and the sensor data. In response to determining to use a combination of the geometric model and the sensor data for a particular part of the estimated state, the system determines a manner by which to combine the geometric model and the sensor data. For example, the system determines an interpolation process. The system may determine the manner by which to combine the geometric model and the sensor data based at least in part on the particular difference between the geometric model and the sensor data (e.g., the system may determine the difference is attributed to noise in the sensor data, or a blocked view of the vision system, etc.)

Estimated state 775 comprises item 704*c*. Corresponding item 704*a* in state 700 is shown to be precisely placed next to the item 702*a*, and corresponding item 704*b* in state 750 is shown be placed a certain distance from item 702*b*.

In some embodiments, the system determines that the difference in apparent locations of items 704*a* and 704*b* is attributed to one or more of (i) movement of the item after placement by a robotic arm or an inaccurate placement of the item by the robotic arm (e.g., relative to the plan determined according to the then-current estimated state), (ii) imprecise placement of the item by the robotic arm, (iii) noise in the sensor data, and/or (iv) imprecision in the sensor data. The system may implement determination of other causes for the difference. In response to determining an expected cause for the difference in location of items 704*a* and 704*b*, the system determines how to model item 704*c*. For example, the system determines whether to (i) solely use the geometric model for modelling the particular part of the stack in the estimated state, (ii) solely use the sensor data for modelling the particular part of the stack in the estimated state, or (iii) use a combination of the geometric model and the sensor data. In some embodiments, the system determines the manner by which to model item 704*c* based at least in part on the determined expected cause of the difference in locations of items 704*a* and 704*b*.

In some embodiments, the system determines to model item 704*c* based on a combination of the geometric model and the sensor data. For example, the location of item 704*c* is determined based on an interpolation of the geometric model (e.g., the location of item 704*a*) and the sensor data (e.g., the location of item 704*b*). As another example, the location of item 704*c* is determined as a midpoint between the geometric model and the sensor data.

In some embodiments, the system determines that the difference in locations of items 704*a* and 704*b* is statistically relevant but not deemed to be entirely unexpected. For example, the system deems the difference in locations of items 704*a* and 704*b* to be attributed to imprecision in placement of the item. Accordingly, the system determines to use the location of item 704*b* as the location of item 704*c* in the estimated state.

Estimated state 775 comprises item 718*c*. Corresponding item 718*a* in state 700 is shown to be precisely placed under item 702*a*, and state 750 has void 758 at the location at which item 718*a* is comprised in state 700. The system determines the difference between state 700 and 750 (e.g., the presence of item 718*a* versus the presence of void 758) and the system determines a manner by which to model such corresponding part of the stack in the estimated state. In the example shown, the system determines that the sensor data is inaccurate (e.g., because it includes void 758 where item 718*c* is to be located). For example, the system may determine that the field of view of the vision system with respect to such part of the stack is blocked. Accordingly, the system determines to use the information for item 718*a* in the geometric model in connection with modelling the location of item 718*c* in the estimated state. For example, the system determines to solely use the geometric model (and not to combine the corresponding information of the sensor data, etc.).

Estimated state 775 comprises items 708*c*, 710*c*, 712*c*, and 714*c*. Corresponding items 708*a*, 710*a*, 712*a*, and 714*a* in state 700 are shown to be precisely placed under item 704*a*, and state 750 has void 752 at the location for such items. The system determines the difference between state 700 and 750 (e.g., the presence of item 718*a* versus the presence of void 758) and the system determines a manner by which to model such a corresponding part of the stack in the estimated state. In the example shown, the system determines that the sensor data is inaccurate (e.g., because it includes void 752 where items 708*a*, 710*a*, 712*a*, and 714*a* are to be located). For example, the system may determine that the field of view of the vision system with respect to such part of the stack is blocked. The system may determine that the sensor data is inconsistent because the sensor data (e.g., state 750 of FIG. 7B) includes 704*b* disposed on top of a set of items without the instability that would result from void 752. Accordingly, the system determines to use the information for items 708*a*, 710*a*, 712*a*, and 714*a* in the geometric model in connection with modelling the location of items 708*c*, 710*c*, 712*c*, and 714*c* in the estimated state. For example, the system determines to solely use the geometric model (and not to combine the corresponding information of the sensor data, etc.).

Similar to the examples above, the system determines the estimated state to include item 716*c* disposed with a void 754 between an item adjacent thereto, item 702*c* being placed with offset 756, and item 706*c* being placed with an offset. The system determines whether to use the geometric model, the sensor data, or both, to model placement of item 702*c* and 716*c*. In some embodiments, the system interpolates location of item 702*a* and 702*b* to determine a location for 702*c*, and/or interpolates location of item 716*a* and 716*b* to determine a location for item 716*c*. In some embodiments, the system uses a midpoint between the geometric model and the sensor data to determine corresponding information for the estimated state.

Figure 8:
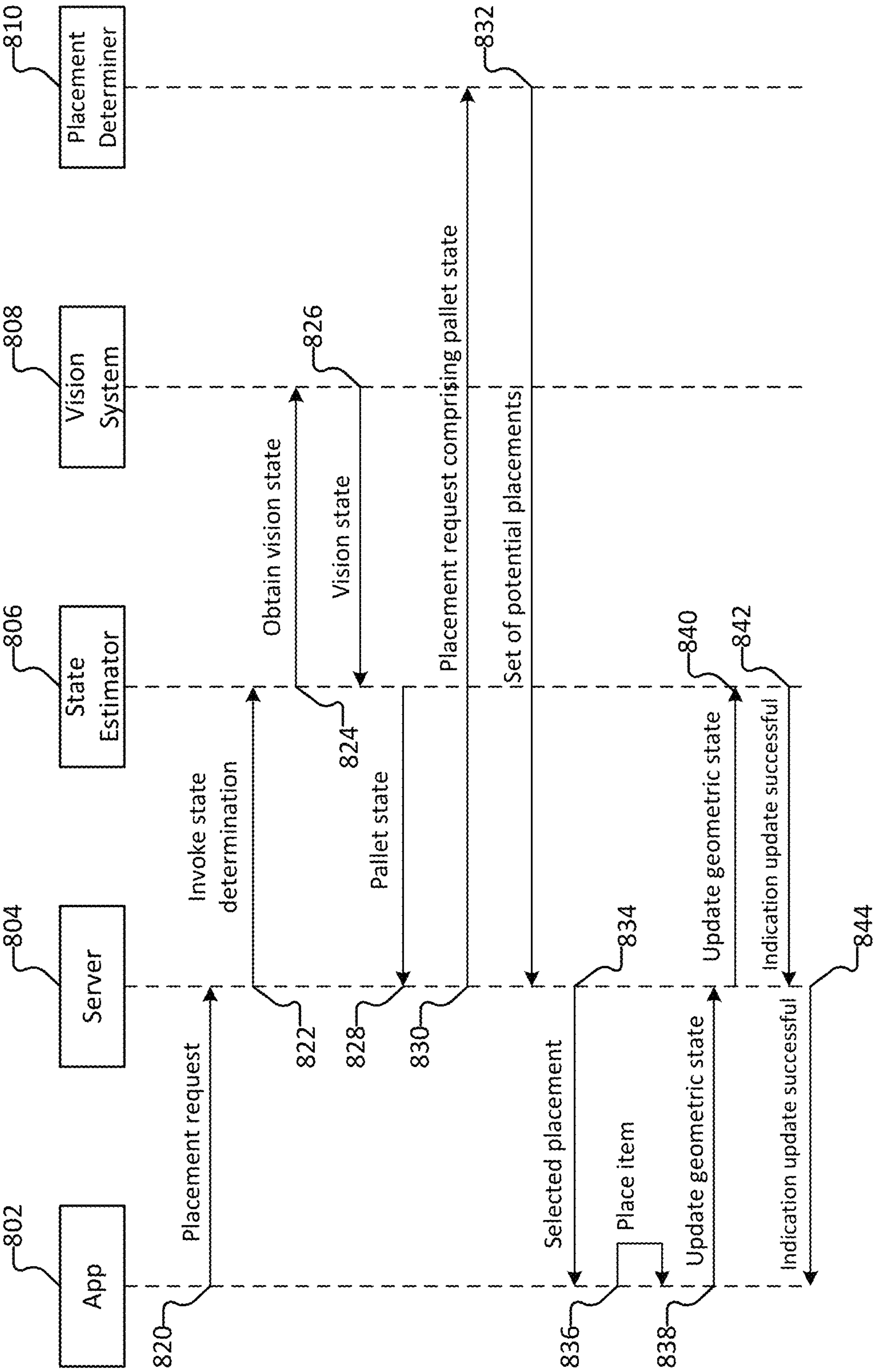
FIG. 8 is a flow diagram illustrating an embodiment of determining an estimate of a state of a pallet and/or stack of items.

FIG. 8 is a flow diagram illustrating an embodiment of determining an estimate of a state of a pallet and/or stack of items. In some embodiments, process 800 is implemented at least in part by robotic system 100 of FIG. 1 and/or system 200 of FIG. 2.

In some embodiments, process 800 is implemented by one or more of an app 802 running on a control system for a robotic arm, server 804, state estimator 806, vision system 808, and placement determiner 810.

At 820, app 802 sends a request to server 804. The request can correspond to a placement request for a plan and/or strategy for placing an item.

In response to receiving the placement request, at 822, server 804 invokes a state determination. For example, server 804 sends a request or instruction to state estimator 806 to determine (and provide) the estimated state. In some embodiments, state estimator 806 is a module running on server 804. In some embodiments, state estimator 806 is a service that is queried by a plurality of different servers/robotic systems. For example, state estimator 806 may be a cloud service.

In response to invoking the state determination, state estimator 806 obtains the vision state. In some embodiments, state estimator 806 sends to vision system 808 a request for a vision state.

In response to receiving the request for the vision state at 824, at 826, vision system 808 provides the vision state to state estimator 806. For example, in response to receiving the request for the vision state, vision system uses one or more sensors in a workspace to capture a snapshot of the workspace.

In response to receiving the vision state, state estimator 806 determines the pallet state (e.g., an estimated state of the pallet and/or stack of items). State estimator 806 may determine the estimated state based on one or more of a geometric model and the vision state. In some embodiments, state estimator 806 combines the geometric model and the vision state (at least with respect to a part of the stack).

At 828, state estimator 806 provides the pallet state to server 804.

At 830, server 804 sends a placement request comprising the pallet state to placement determiner 810. In some embodiments, placement determiner 810 is a module running on server 804. In some embodiments, placement determiner 810 is a service that is queried by a plurality of different servers/robotic systems. For example, placement determiner 810 may be a cloud service.

At 832, placement determiner 810 provides a set of one or more potential placements to server 804. The set of one or more potential placements may be determined based at least in part on an item(s) to be placed (e.g., attributes associated with the item) and the pallet state (e.g., available locations and attributes of items within the stack of items), etc.

In some embodiments, the set of one or more potential placements is a subset of all possible placements. For example, placement determiner 810 uses a cost function to determine the set of one or more potential placements to provide to server 804. Placement determiner 810 may determine potential placements that satisfy a cost criteria (e.g., have a cost less than a cost threshold) with respect to the cost function.

In response to receiving the set of one or more potential placements, at 834, server 804 selects a placement and sends the selected placement to app 802. For example, the selected placement is provided as a response to the initial placement request at 820.

At 836, app 802 controls a robotic arm to place the item. In some embodiments, app 802 determines a plan to move the item to the selected placement (e.g., based on an attribute (s) of the item and the location corresponding to the selected placement, such as coordinates in the workspace).

At 838, app 802 provides an indication to server 804 to perform an update with respect to the geometric state. For example, app 802 provides confirmation that the placement of the item was performed at 836 and server 804 deems such confirmation to be an indication that an update to the geometric state (e.g., geometric model) is to be invoked.

At 840, server 804 sends to state estimator 806 a request to update the geometric state. For example, server 804 requests that state estimator 806 update the geometric model to reflect placement of the item in accordance with the corresponding plan.

In response to receiving the request to update the geometric state, state estimator 806 performs the corresponding update. At 842, state estimator 806 provides an indication to server 804 that the geometric state was successfully updated.

At 844, server 804 provides to app 802 an indication that the geometric state was successfully updated to reflect placement of the item.

Process 800 may be repeated for a set of items to be stacked.

Figure 9:
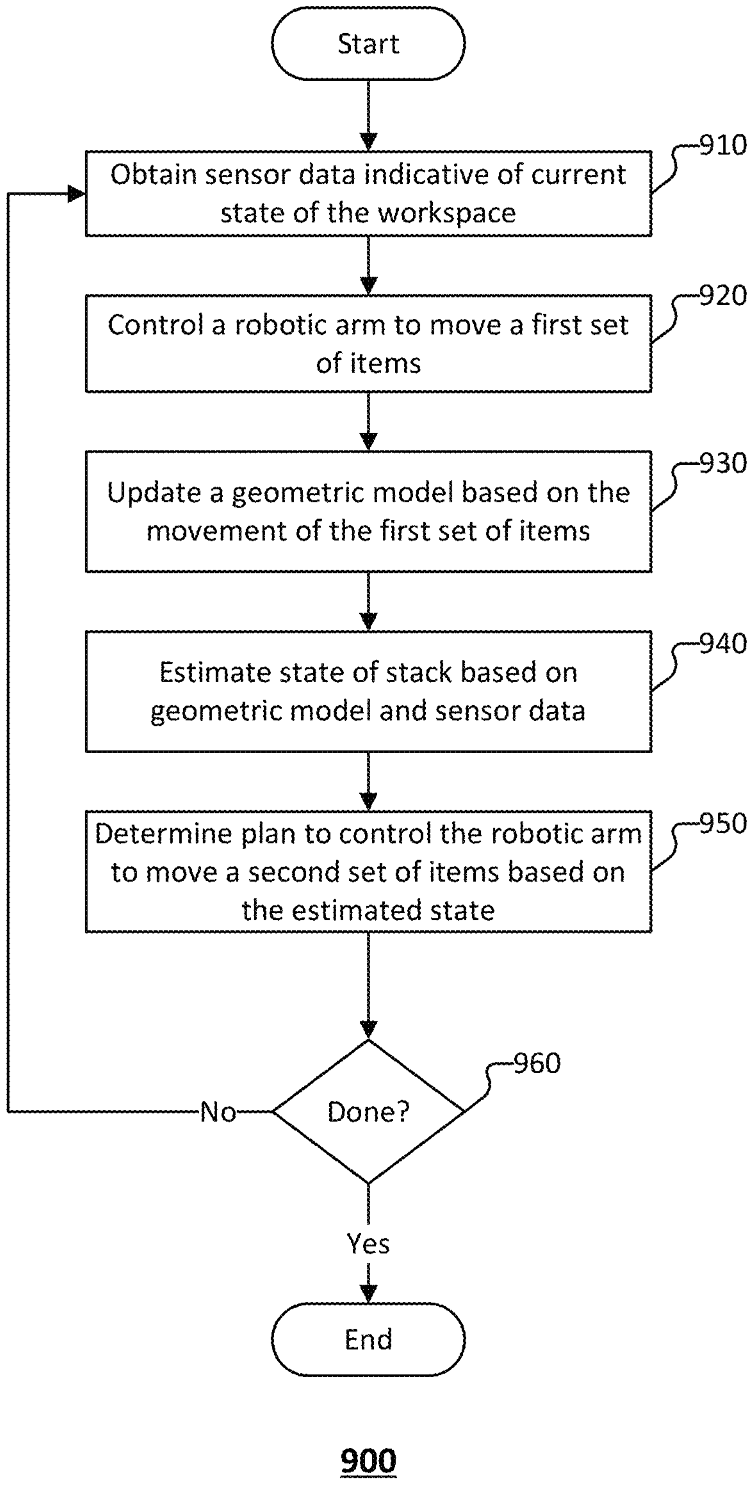
FIG. 9 is a flow diagram illustrating a process of palletizing/de-palletizing a set of items according to various embodiments.

FIG. 9 is a flow diagram illustrating a process of palletizing/de-palletizing a set of items according to various embodiments. In some embodiments, process 900 is implemented at least in part by robotic system 100 of FIG. 1 and/or system 200 of FIG. 2.

At 910, sensor data indicative of the current state of the workspace is obtained. In some embodiments, the system receives the sensor data from a vision system comprised in the workspace.

At 920, a robotic arm is controlled to move a first set of items. In some embodiments, the system determines a plan to move the first set of items and controls a robotic arm to move (e.g., pick and place) the first set of items according to the plan.

At 930, a geometric model is updated based on the movement of the first set of items. In some embodiments, in response to moving the first set of items, the system updates the geometric model to reflect the movement (e.g., placement of the first set of items). In the case of a palletization of items, the geometric model is updated to reflect placement of the first set of items on the stack.

At 940, an estimated state (e.g., state of the stack of items) is determined based at least in part on the geometric model and the sensor data. The sensor data may correspond to sensor data obtained at 910, or alternatively, updated sensor data captured after/during movement of the first set of items. In some embodiments, the system determines the estimated state based on a combination of the geometric model and the sensor data.

At 950, a plan to control the robotic arm to move a second set of items is determined based at least in part on the estimated state. In some embodiments, in response to determining the plan to move the second set of items, the system controls the robotic arm to move the second set of items in accordance with the corresponding plan.

According to various embodiments, the system determines the estimated state after movement of each set of items (e.g., a set of items determined based on a number of items, or based on attributes of a current item or a previously placed item, etc.).

At 960, a determination is made as to whether process 900 is complete. In some embodiments, process 900 is determined to be complete in response to a determination that no further updating of the estimated state is to be performed, no further items are to be moved, a user has exited the system, an administrator indicates that process 900 is to be paused or stopped, etc. In response to a determination that process 900 is complete, process 900 ends. In response to a determination that process 900 is not complete, process 900 returns to 910.

Although the foregoing examples are described in the context of palletizing or de-palletizing a set of items, various embodiments may be implemented in connection with singulating a set of items and/or kitting a set of items. For example, various embodiments are implemented to determine/estimate a state of the workspace (e.g., chute, conveyor, receptacle, etc.) based at least in part on geometric data and sensor data (e.g., a combination of the geometric data and sensor data, such as an interpolation between the geometric data and sensor data).

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:

a communication interface configured to receive, from one or more sensors deployed in a workspace, sensor data indicative of a current state of the workspace, the workspace comprising a pallet or other receptacle and a plurality of items stacked on the pallet or in the other receptacle; and one or more processors coupled to the communication interface and configured to:

control a robotic arm to place a first set of items on or in, or remove the first set of items from, the pallet or the other receptacle;

update a geometric model based on the first set of items placed on or in, or removed from, the pallet or the other receptacle;

generate an estimated state of the pallet or the other receptacle and one or more items stacked on the pallet or in the other receptacle, wherein the estimated state is determined based on a combination of (i) the geometric model and (ii) a noise according to a predefined noise profile; and use the estimated state to generate or update a plan to control the robotic arm to place a second set of items on or in, or remove the second set of items from, the pallet or the other receptacle.

2. The robotic system of claim 1, wherein the noise and the predefined noise profile comprise a plurality of different noise types and a corresponding plurality of noise profiles.

3. The robotic system of claim 1, wherein the predefined noise profile comprises a profile of noise inherent in a collection of sensor data from at least one of the one or more sensors.

4. The robotic system of claim 1, wherein the predefined noise profile comprises a profile of noise caused by a mis-alignment or mis-calibration of at least one of the sensors.

5. The robotic system of claim 1, wherein the predefined noise profile comprises a profile of noise caused by light reflecting off an item or object in the workspace.

6. The robotic system of claim 1, wherein the predefined noise profile is determined based on an empirical analysis of a performance of a vision system comprising the one or more sensors deployed in the workspace.

7. The robotic system of claim 1, wherein the predefined noise profile comprises a profile of noise caused by mechanical physics of items or objects within the workspace.

8. The robotic system of claim 1, wherein the predefined noise profile comprises a profile of noise caused by deformation of an item in the workspace.

9. The robotic system of claim 1, wherein the geometric model reflects respective attributes of one or more of the first set of items and the second set of items.

10. The robotic system of claim 9, wherein the geometric model reflects respective weights of items comprised in the one or more of the first set of items and the second set of items.

11. The robotic system of claim 1, wherein the geometric model reflects a respective rigidity compressibility of items comprised in one or more of the first set of items and the second set of items.

12. The robotic system of claim 1, wherein the geometric model reflects a respective strength of packaging of items comprised in one or more of the first set of items and the second set of items.

13. The robotic system of claim 1, wherein the geometric model includes a distribution of weight across a plurality of items comprised in one or more of the first set of items and the second set of items.

14. The robotic system of claim 1, wherein the geometric model comprises an expected stability of the one or more items stacked on the pallet or in the other receptacle.

15. The robotic system of claim 14, wherein the expected stability is based at least in part on a set of locations at which the robotic system believes each item was placed, and one or more attributes of each item stacked on the pallet or in the other receptacle.

16. The robotic system of claim 1, wherein the geometric model comprises an expected stability of the one or more items stacked on the pallet or in the other receptacle and one or more simulated items for which simulation of a stacking of the one or more simulated items is performed.

17. The robotic system of claim 1, wherein the one or more sensors comprise a 3D camera.

18. The robotic system of claim 1, wherein a location of each item is determined based on an interpolation between (i) a location of the respective item according to the sensor data, and (ii) a location of the respective item according to the geometric model.

19. The robotic system of claim 1, wherein:

the first set of items comprises N items; and

N is a positive integer that is dynamically determined.

20. The robotic system of claim 19, wherein the state of the one or more items stacked on or in the pallet or the other receptacle is estimated after the N items are stacked.

21. The robotic system of claim 20, wherein the state is estimated before the N items are stacked in response to a determination that an irregularly shaped item was placed.

22. The robotic system of claim 1, wherein:

the second set of items corresponds to a next M items on a source to be placed on the pallet or receptacle; and M is a positive integer.

23. A method to control a robot, comprising:

receiving, from one or more sensors deployed in a workspace, sensor data indicative of a current state of the workspace, the workspace comprising a pallet or other receptacle and a plurality of items stacked on the pallet or in the other receptacle;

controlling, by one or more processors, a robotic arm to place a first set of items on or in, or remove the first set of items from, the pallet or the other receptacle;

updating a geometric model based on the first set of items placed on or in, or removed from, the pallet or the other receptacle;

generating an estimated state of the pallet or the other receptacle and one or more items stacked on the pallet or in the other receptacle, wherein the estimated state is determined based on a combination of (i) the geometric model and (ii) a noise according to a predefined noise profile; and using the estimated state to generate or update a plan to control the robotic arm to place a second set of items on or in, or remove the second set of items from, the pallet or the other receptacle.

24. A non-transitory computer readable mediums storing thereon a computer program product, comprising computer instructions executed by a processor for:

receiving, from one or more sensors deployed in a workspace, sensor data indicative of a current state of the workspace, the workspace comprising a pallet or other receptacle and a plurality of items stacked on the pallet or in the other receptacle;

controlling, by one or more processors, a robotic arm to place a first set of items on or in, or remove the first set of items from, the pallet or the other receptacle;

updating a geometric model based on the first set of items placed on or in, or removed from, the pallet or the other receptacle;

generating an estimated state of the pallet or the other receptacle and one or more items stacked on the pallet or in the other receptacle, wherein the estimated state is determined based on a combination of (i) the geometric model and (ii) a noise according to a predefined noise profile; and using the estimated state to generate or update a plan to control the robotic arm to place a second set of items on or in, or remove the second set of items from, the pallet or the other receptacle.

* * * * *